US012749060B2

(12) United States Patent
Williams et al.

(10) Patent No.: US 12,749,060 B2
(45) Date of Patent: Sep. 29, 2026

(54) NFT ENFORCEMENT CONTROL SYSTEM

(71) Applicant: Frontage Road Holdings, LLC, Wilmington, DE (US)

(72) Inventors: Josh Williams, Sacramento, CA (US); Raymond A. Chiapuzio, Eugene, OR (US)

(73) Assignee: Frontage Road Holdings, LLC, Wilmington, DE (US)

( * ) Notice: Subject to any disclaimer, the term of this patent is extended or adjusted under 35 U.S.C. 154(b) by 230 days.

(21) Appl. No.: 18/336,924

(22) Filed: Jun. 16, 2023

(65) Prior Publication Data

US 2023/0419285 A1 Dec. 28, 2023

Related U.S. Application Data

(60) Provisional application No. 63/366,590, filed on Jun. 17, 2022.

(51) Int. Cl.
*G06Q 20/14* (2012.01)
*G06Q 20/36* (2012.01)

(52) U.S. Cl.
CPC ........... *G06Q 20/145* (2013.01); *G06Q 20/36* (2013.01); *G06Q 2220/00* (2013.01)

(58) Field of Classification Search
CPC ................. G06Q 20/145; G06Q 20/36; G06Q 2220/00; G06Q 20/326; G06Q 20/401;
(Continued)

(56) References Cited

U.S. PATENT DOCUMENTS 10,250,394 B1 4/2019 Borne-Pons et al.
10,489,757 B2 11/2019 Melika et al.
(Continued)

FOREIGN PATENT DOCUMENTS

CN 113127908 A 7/2021
CN 114565378 B * 2/2025 ........... H04L 9/3066
(Continued)

OTHER PUBLICATIONS

"Dada Protocol White paper", AI tool to empower everyone create beautiful world, Vison2.0, May 2021, 8 pages.
(Continued)

*Primary Examiner* — Yingying Zhou
(74) *Attorney, Agent, or Firm* — Hamilton, Brook, Smith & Reynolds, P.C.

(57) ABSTRACT

A computer-based system, method, and computer program product for enforcing conditional transfer of digital assets leverage a cross-chain clearinghouse control system implemented upon one or more blockchain networks. The cross-chain clearinghouse control system is configured to approve a transfer of a digital asset if the transfer satisfies an encoded condition or rule configured in the digital asset. Likewise, the cross-chain clearinghouse control system is configured to disapprove and thereby block the transfer if the transfer does not satisfy such a condition or rule. One of a first and second entity involved in the transfer is a digital wallet implemented upon the blockchain network, and an other of the first and second entities is implemented apart from the blockchain network.

16 Claims, 13 Drawing Sheets

(58) Field of Classification Search
CPC ...... G06Q 30/06; G06Q 20/023; G06Q 20/02; G06Q 20/405; H04L 9/0897; H04L 9/3218; H04L 9/50
See application file for complete search history.

(56) References Cited

U.S. PATENT DOCUMENTS

| | | | | |
|---|---|---|---|---|
| 10,505,726 | B1 | 12/2019 | Andon et al. | |
| 10,540,653 | B1 | 1/2020 | James et al. | |
| 10,581,847 | B1 | 3/2020 | Sun et al. | |
| 10,915,874 | B2 | 2/2021 | Code et al. | |
| 10,951,409 | B2 | 3/2021 | Konda et al. | |
| 11,075,891 | B1 | 7/2021 | Long et al. | |
| 11,258,593 | B1 | 2/2022 | Cox et al. | |
| 11,880,809 | B2 * | 1/2024 | Williams | G06Q 20/38215 |
| 12,099,997 | B1 * | 9/2024 | Hoffberg | G06Q 20/065 |
| 12,626,232 | B2 | 5/2026 | Williams et al. | |
| 2017/0178237 | A1 | 6/2017 | Wong | |
| 2017/0213289 | A1 | 7/2017 | Doney | |
| 2017/0243289 | A1 | 8/2017 | Rufo | |
| 2018/0288022 | A1 | 10/2018 | Madisetti et al. | |
| 2019/0205881 | A1 | 7/2019 | Borzilleri et al. | |
| 2019/0220852 | A1 | 7/2019 | Black et al. | |
| 2019/0244207 | A1 | 8/2019 | Samuel | |
| 2019/0251199 | A1 * | 8/2019 | Klianev | G06Q 40/04 |
| 2019/0318328 | A1 * | 10/2019 | Castinado | G06Q 20/382 |
| 2019/0386968 | A1 * | 12/2019 | Good | H04L 63/123 |
| 2020/0005254 | A1 | 1/2020 | Wright et al. | |
| 2020/0005282 | A1 | 1/2020 | Kim | |
| 2020/0044863 | A1 | 2/2020 | Yadlin et al. | |
| 2020/0159890 | A1 | 5/2020 | Chui et al. | |
| 2020/0219093 | A1 | 7/2020 | Malhotra et al. | |
| 2020/0250752 | A1 | 8/2020 | Sugarman | |
| 2020/0258159 | A1 | 8/2020 | Stradling et al. | |
| 2020/0334752 | A1 | 10/2020 | Doney et al. | |
| 2020/0342539 | A1 | 10/2020 | Doney | |
| 2020/0394651 | A1 * | 12/2020 | Kreder, III | G06Q 20/22 |
| 2021/0083872 | A1 | 3/2021 | Desmarais et al. | |
| 2021/0097528 | A1 | 4/2021 | Wang | |
| 2021/0118051 | A1 | 4/2021 | Gee et al. | |
| 2021/0133700 | A1 * | 5/2021 | Williams | G06Q 20/367 |
| 2021/0133708 | A1 | 5/2021 | Robertson et al. | |
| 2021/0142318 | A1 | 5/2021 | Qian et al. | |
| 2021/0150626 | A1 | 5/2021 | Robotham | |
| 2021/0158350 | A1 * | 5/2021 | Gaddam | G06Q 20/3278 |
| 2021/0158444 | A1 | 5/2021 | Di Nicola et al. | |
| 2021/0248594 | A1 | 8/2021 | Yantis et al. | |
| 2021/0256070 | A1 | 8/2021 | Tran et al. | |
| 2021/0326854 | A1 | 10/2021 | Yantis et al. | |
| 2021/0326862 | A1 | 10/2021 | Yantis et al. | |
| 2021/0327216 | A1 | 10/2021 | Naramore et al. | |
| 2021/0383334 | A1 | 12/2021 | Krasnyansky | |
| 2021/0383363 | A1 | 12/2021 | Smirnov | |
| 2022/0021728 | A1 | 1/2022 | Kelly | |
| 2022/0058282 | A1 | 2/2022 | Ricotta, Jr. et al. | |
| 2022/0067710 | A1 | 3/2022 | Yantis et al. | |
| 2022/0076219 | A1 | 3/2022 | Filter et al. | |
| 2022/0084013 | A1 | 3/2022 | Kulkarni et al. | |
| 2022/0085989 | A1 | 3/2022 | Yadlin et al. | |
| 2022/0138705 | A1 * | 5/2022 | Wright | G06Q 20/065 705/39 |
| 2022/0188810 | A1 | 6/2022 | Doney | |
| 2022/0230147 | A1 | 7/2022 | Wright et al. | |
| 2023/0100422 | A1 * | 3/2023 | Jakobsson | G06Q 20/38215 705/67 |
| 2023/0266930 | A1 * | 8/2023 | Baker | H04L 63/10 358/1.14 |
| 2023/0298005 | A1 * | 9/2023 | Saad | G06Q 20/403 |
| 2023/0334444 | A1 * | 10/2023 | Chan | H04L 9/50 |
| 2023/0412393 | A1 | 12/2023 | Josh et al. | |
| 2023/0419274 | A1 | 12/2023 | Josh et al. | |
| 2024/0137228 | A1 * | 4/2024 | Davies | H04L 9/3247 |
| 2024/0249289 | A1 | 7/2024 | Chiapuzio | |
| 2024/0257116 | A1 | 8/2024 | Chiapuzio | |
| 2024/0370854 | A1 | 11/2024 | Williams et al. | |
| 2024/0412207 | A1 | 12/2024 | Williams et al. | |
| 2025/0097045 | A1 * | 3/2025 | Zhang | H04L 9/3239 |

FOREIGN PATENT DOCUMENTS

| | | | |
|---|---|---|---|
| EP | 3627373 | B1 | 9/2020 |
| WO | 2017/131929 | A1 | 8/2017 |
| WO | 2019/194803 | A1 | 10/2019 |
| WO | 2019/213700 | A1 | 11/2019 |
| WO | 2021/211292 | A1 | 10/2021 |
| WO | 2022/102818 | A1 | 5/2022 |
| WO | 2022/245929 | A1 | 11/2022 |
| WO | 2023/245182 | A1 | 12/2023 |
| WO | 2023/245196 | A1 | 12/2023 |
| WO | 2023/245199 | A1 | 12/2023 |
| WO | 2024/145513 | A1 | 7/2024 |
| WO | 2024/158669 | A1 | 8/2024 |
| WO | 2024/158879 | A1 | 8/2024 |
| WO | 2024/233317 | A1 | 11/2024 |

OTHER PUBLICATIONS

Cayo, F. S., et al., "Blockchain scalability for smart contract systems using eUTXO model", IEEE, IOTJ, XX, No. X, Jan. 2022, 9 pages.
Dr. F., "B.AMM—Efficient Automated Market Maker for DeFi Liquidations", Jun. 2021.
Harvey, C. R., et al., "DeFi and the Future of Finance", John Wiley & Sons, Aug. 2021, 208 pages.
International Search Report and Written Opinion received for PCT Patent Application No. PCT/US2023/068636, mailed on Nov. 6, 2023, 12 pages.
Karapapas, C., et al., "Fully Decentralized Trading Games with Evolvable Characters using NFTs and IPFS", IFIP Networking Conference (IFIP Networking), May 28, 2021, 3 pages.
Lindell, Y., et al., "Secure multiparty computation", Communications of the AMC, 2020, pp. 86-96.
Liu, F., et al., "A Blockchain-Based Digital Asset Platform with Multi-Party Certification", Applied Sciences, vol. 12, No. 11, 2022, 16 pages.
Longo, R., et al., "Threshold Multi-Signature with an Online Recovery Party", Jan. 7, 2020, 31 pages.
Ngo, R., et al., "First Fully Decentralized AMM based Money Market Protocol", Oct. 21, 2021, 15 pages.
Nicola, V. D., et al., "Resilient Custody of Crypto-Assets, and Threshold Multisignatures", Mathematics, vol. 8, 2020, No. 1773, 17 pages.
Popescu, A.D., "Non-Fungible Tokens (NFT)—Innovation beyond the craze", 5th International Conference on Innovation in Business, Economics & Marketing research (IBEM-2021) Proceedings of Engineering & Technology—PET—vol. 66 , 2021, 6 pages.
Salleras, X., et al., "ZPIE: Zero-Knowledge Proofs in Embedded Systems", Mathematics , vol. 9, No. 20, Oct. 13, 2021, 17 pages.
Unruh, D., et al., "Non-Interactive Zero-Knowledge Proofs in the Quantum Random Oracle Model", Lecture Notes in Computer Science book series, vol. 9057, Jan. 2015, 30 pages.
Wang, et al., "Non-Fungible Token (NFT): Overview Evaluation", Opportunities and Challenges, Oct. 25, 2021.
Wang. Y., "Automated Market Makers for Decentralized Finance (DeFi)", arXiv preprint arXiv:2009.01676, Sep. 3, 2020, 14 pages.
Warren, W., et al., "0x an open protocol for decentralized exchange on the Ethereum blockchain", Brave New Coin, URL: https://github.com/0xProject/whitepaper, 2017, pp. 4-18.
Wiener, F., "Secure Multiparty Computation (MPC) for Digital Asset Custody Wallets", URL: https://sepior.com/blog/secure-multiparty-computation-mpc-for-digital-asset-custody-wallets, Feb. 9, 2021, 13 pages.
Xu, Z., et al., "An Efficient Supply Chain Architecture Based on Blockchain for High-value Commodities", BSCI '19: Proceedings of the 2019 ACM International Symposium on Blockchain and Secure Critical Infrastructure, Jul. 2019, 9 pages.

(56) References Cited

OTHER PUBLICATIONS

Unruh, D., "Non-Interactive Zero-Knowledge Proofs in the Quantum Random Oracle Model", University of Tartu, International Association for Cryptologic Research 2015, EUROCRYPT 2015, Part II, LNCS 9057, pp. 755-784.

* cited by examiner

NFT ENFORCEMENT CONTROL SYSTEM

RELATED APPLICATIONS

This application claims the benefit of U.S. Provisional Application No. 63/366,590, filed on Jun. 17, 2022. This application is related to U.S. application Ser. No. 18/336,679, titled "Multisignature Custody of Digital Assets", filed on Jun. 16, 2023, which claims the benefit of U.S. Provisional Application No. 63/366,589, filed on Jun. 17, 2022, and U.S. application Ser. No. 18/336,879, titled "Fully Collateralized Automated Market Maker", filed on Jun. 16, 2023, which claims the benefit of U.S. Provisional Application No. 63/366,595, filed on Jun. 17, 2022. The entire teachings of the above applications are incorporated herein by reference.

BACKGROUND

A blockchain may be implemented as a peer-to-peer (P2P), electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

Blockchain may be used for implementation of "smart contracts" that can be associated with digital asset. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets.

An area of blockchain-related interest is the use of "tokens" to represent and transfer assets via the blockchain. A token serves as an identifier that allows an asset to be referenced from the blockchain. Fungible tokens are uniform. In other words, fungible tokens of the same type are identical in specification, and each fungible token is identical to another fungible token of the same type. Fungible tokens may be divisible into smaller amounts. Similar to currency, where bills can be divided into coins of an equivalent value, fungible tokens may be divisible. Non-fungible tokens (NFTs), however, cannot be replaced with other tokens of the same type. NFTs represent non-fungible assets. Non-fungible assets have unique information or attributes. Each NFT is unique and differs from other tokens of the same class, and, unlike a fungible token, NFTs typically cannot be divided. Blockchain gaming systems may use tokens or NFTs to create different parts of the game, such as rules, characters, weapons, and skins.

Cryptocurrency wallets may be implemented to securely store and manage blockchain assets, tokens, NFTs, and cryptocurrencies. These wallets may allow users to spend, receive, and trade digital assets.

SUMMARY

While a blockchain-enabled platform for minting and transferring ownership of digital assets can be configured to effectively enforce rules governing transfers of digital assets with that blockchain platform, extending enforcement of such rules when the digital asset is transferred another blockchain system may not be viable. The application programming interface that enables a transfer of a digital asset, such as an NFT, from one blockchain platform to another, typically lacks functionality for extending enforcement of smart contracts across blockchain platforms or electronic wallets. A prevailing problem with NFTs, for example, is often that the creator's royalty is tied to the marketplace where the NFT was originally minted. A further issue is that a creator of an NFT may be unable to prevent a buyer of that NFT from listing its NFT on other, competing blockchain systems.

Further, blockchain-enabled marketplace for digital assets can be configured to effectively enforce rules (preset rules/conditions encoded in the digital assets) governing transfers of digital assets occurring within such a marketplace, but existing marketplaces lack functionality for extending enforcement of such encoded rules to transfers involving one or more entities that exist apart from the blockchain network supporting said marketplace. Such transactions may involve, for example, two or more separate blockchain networks, or may even occur in an undetectable offline manner. Motivation for conducting transactions outside the confines of a given marketplace may include avoiding payment of royalties, taxes, or a full price of an item available within the given marketplace. Alternatively, malicious actors may seek to breach security protocols of the blockchain network and conduct a backdoor transaction at little to no cost, for personal gain. In order to preserve value of digital assets and ensure that sellers and creators thereof are effectively compensated according to agreements backed by the given marketplace, it is desirable for the given marketplace to possess means of enforcing such agreements and encoded rules governing transfers of said digital assets, regardless of whether or not said transfers occur entirely within the given marketplace.

Such transactions may involve, for example, two or more separate blockchain networks, or may even occur in an undetectable offline manner. Motivation for conducting transactions outside the confines of a given marketplace may include disengaging the smart contract code associated with the digital asset, or avoiding payment of royalties, taxes, or a full price of an item available within the given marketplace. Alternatively, malicious actors may seek to breach security protocols of the blockchain network and conduct a backdoor transaction at little to no cost, for personal gain. In order to preserve value of digital assets and ensure that sellers and creators thereof are effectively compensated according to agreements backed by the given marketplace, it is desirable for the given marketplace to possess means of enforcing such agreements and encoded rules governing transfers of said digital assets, regardless of whether or not said transfers occur entirely within the given marketplace.

Embodiments include a computer-based system for enforcing conditional transfer of digital assets. In some embodiments, the system includes a first blockchain network with multiple nodes. One of the multiple nodes of the first blockchain network may have a secure cryptoprocessor implemented as a dedicated microprocessor configured to execute a cross-chain clearinghouse control system The cross-chain clearinghouse control system may be embedded on the secure cryptoprocessor and configured to approve a cross-chain transfer of a digital asset from a first entity to a second entity if the transfer satisfies a preset rule encoded in the digital asset or disapprove the transfer if the transfer does not satisfy the rule. One of the first and second entities may be a digital wallet implemented upon the first blockchain network, and an other of the first and second entities may be implemented on a second blockchain network, separate and disparate from the first blockchain network.

In some embodiments, the preset rule encoded in the digital asset may trigger a royalty requirement that automatically causes recursive asset transfer back to a creator or prior owner of the digital asset upon transfer of the digital asset. The preset rule encoded in the digital asset may trigger a fractionalized royalty model that requires enforcement of a distributed royalty arrangement. The first and second blockchain networks may be respectively configured to support first and second digital asset platforms.

The other of the first and second entities may be implemented upon the second blockchain network at a network location separate from a corresponding network location of the first blockchain network. Alternatively, the other of the first and second entities may be an offline entity.

In some embodiments, the multiple nodes may be configured to create a token representing the digital asset. In these embodiments, the preset rule encoded in the digital asset may be configured to influence a transaction value of the digital asset. Such a transaction value may be reflected in a value of the created token.

The preset rule encoded in the digital asset may include a threshold value pertaining to a transaction value of the digital asset. In some such embodiments, the preset rule encoded in the digital asset may be configured to implement a transaction value floor for the transfer of the digital asset. The clearinghouse control system may include a minimax recursive algorithm to control the transaction value floor and the threshold value. In other such embodiments, the preset rule encoded in the digital asset may be configured to require a transaction value of the digital asset to remain within a bounded percentage of a transaction value change from a prior transaction.

The first blockchain network may be decentralized. The preset rule encoded in the digital asset may include a smart contract. The digital asset may be a non-fungible token (NFT).

Embodiments further include a computer-implemented method of enforcing conditional transfer of digital assets. In some embodiments, the method includes implementing, upon a blockchain network, a cross-chain clearinghouse control system configured to approve a transfer of a digital asset from a first entity to a second entity in response to the transfer satisfying a preset rule encoded in the digital asset or disapprove the transfer in response to the transfer not satisfying the rule. The cross-chain clearinghouse control system may be embedded on a cryptoprocessor of one of multiple nodes of the blockchain network. One of the first and second entities may be a digital wallet implemented upon the blockchain network, and an other of the first and second entities may be implemented apart from the blockchain network.

Embodiments further include a non-transitory computer program product for enforcing conditional transfer of digital assets. In some embodiments, the non-transitory computer program product includes a computer-readable medium with computer code instructions stored thereon. The computer code instructions are configured, when executed by a processor, to cause the processor to implement, upon a blockchain network, a cross-chain clearinghouse control system configured to approve a transfer of a digital asset from a first entity to a second entity in response to the transfer satisfying a preset rule encoded in the digital asset or disapprove the transfer in response to the transfer not satisfying the rule. The cross-chain clearinghouse control system may be embedded on a cryptoprocessor of one of multiple nodes of the blockchain network. One of the first and second entities may be a digital wallet implemented upon the blockchain network, and an other of the first and second entities may be implemented apart from the blockchain network.

Alternative method and computer program product embodiments parallel those described above in connection with the example computer-based system embodiments.

It should be understood that example embodiments disclosed herein can be implemented in the form of a computer-implemented method, apparatus, computer-based system, or computer program product.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
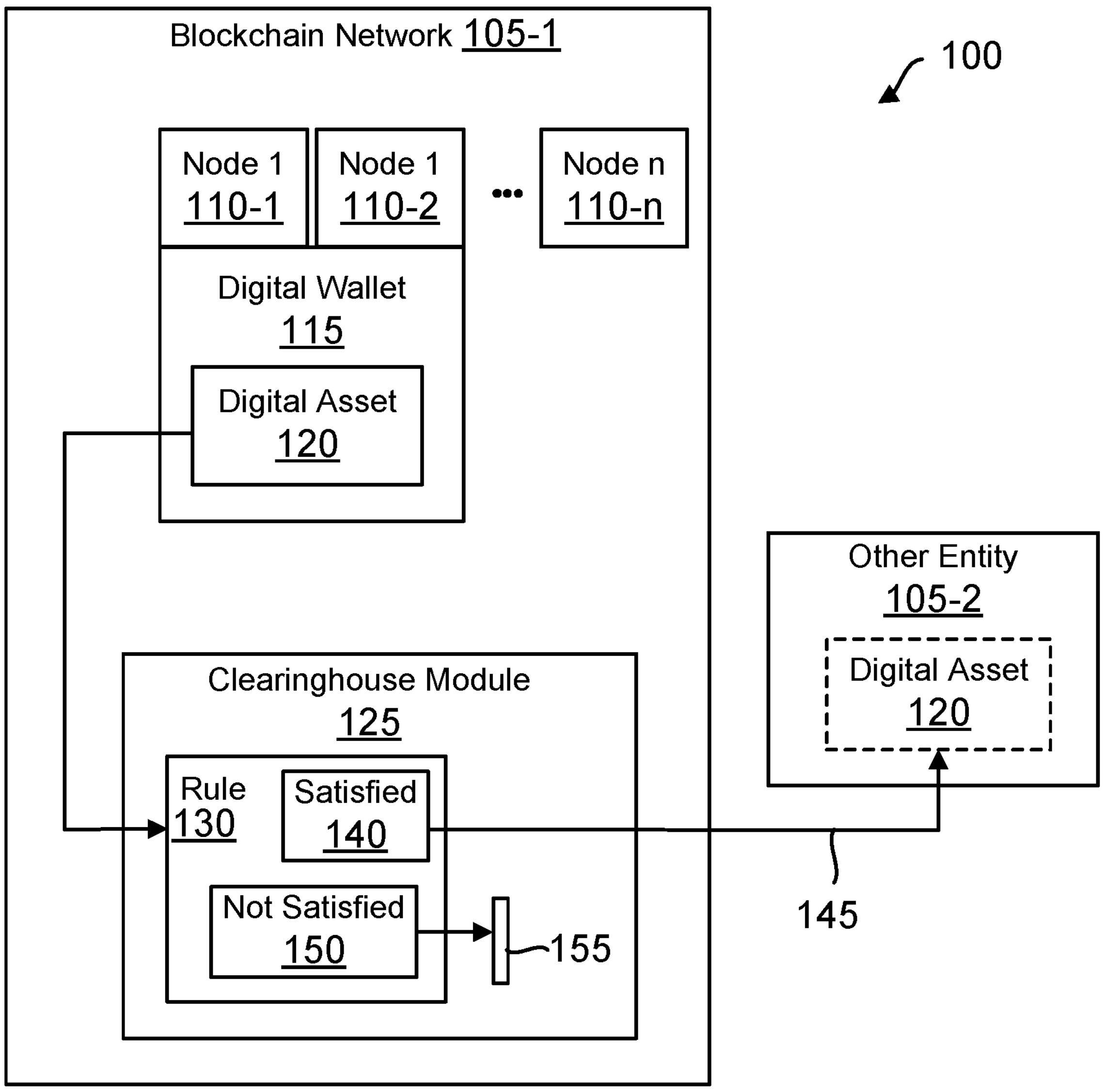
FIG. 1 is a simplified block diagram of an example embodiment of a system for enforcing conditional transfer of digital assets.

A description of example embodiments follows.

In general, blockchain is a write-once, append-many type electronic ledger. Blockchain is an architecture that allows disparate users to make transactions and creates an unchangeable record of those transactions. To move anything of value over any kind of blockchain, a network of nodes must first agree that a corresponding transaction is valid. As a peer-to-peer (P2P) network, combined with a distributed time-stamping server, blockchain ledgers can be managed autonomously to exchange information between disparate parties; there is no need for an administrator. In effect, the blockchain users are the administrator.

Blockchain's rapid development has given rise to many different kinds of chains, leading to cross-chain technology. Cross-chain, as its name suggests, allows the transmission of value and information between different blockchains. According to an example embodiment, a digital asset may be exchanged, cross-chain, securely, and despite differences between constraints or rules of operation that may be established for the different blockchains. Such a digital asset may be in the form of a token, which may be fungible, or may be a non-fungible token (NFT). Such constraints or rules may be in the form of smart contracts, or other forms. Differences between such constraints or rules may include disparate levels of rigor or leniency of such constraints or rules between or among different blockchain networks.

In some embodiments, blockchain may be a peer-to-peer (P2P), electronic ledger that is implemented as a computer-based decentralized, distributed system made up of blocks, which, in turn, are made up of transactions. Each transaction may be a data structure that encodes a transfer of control of a digital asset between participants in the blockchain system, and that includes at least one input and at least one output. Each block may contain a hash of a previous block so that blocks become chained together to create a permanent, unalterable record of all transactions that have been written to the blockchain since its inception. Transactions may contain small programs, known as scripts, embedded into their inputs and outputs; the scripts may specify how and by whom the outputs of the transactions can be accessed.

For a transaction to be written to the blockchain, it must be "validated." Network nodes (miners) may perform work to ensure that each transaction is valid, with invalid transactions being rejected from the network. Software clients installed on the nodes may perform this validation work on an unspent transaction (UTXO) by executing its locking and unlocking scripts. If execution of the locking and unlocking scripts evaluates to TRUE, the transaction is valid and is written to the blockchain. Thus, for a transaction to be written to the blockchain, it should be: (i) validated by a first node that receives the transaction—e.g., if the transaction is validated, the node relays it to other nodes in the network; (ii) added to a new block built by a miner; and (iii) mined, e.g., added to the public ledger of past transactions.

Blockchain may be used for implementation of "smart contracts" that can be associated with digital asset. These are computer programs designed to automate execution of terms of a machine-readable contract or agreement. Unlike a traditional contract, which would be written in natural language, a smart contract is a machine-executable program that may include rules for processing inputs to generate results; these results may then cause actions to be performed depending upon those results. With respect to commercial transactions, for example, these may involve a transfer of property rights and/or assets. Such assets may include real property, personal property (including both tangible and intangible property), digital assets such as software, or any other type of asset. In the digital economy, there is often an expectation that exchanges and transfers will be performed in a timely manner and across vast distances. This expectation, along with practical, technical limitations, means that traditional forms of asset transfer, such as physical delivery of hardcopy of documents representing a contract, negotiable instrument, etc., or a tangible asset itself, are not desirable. Thus, smart contracts can provide enhanced control, efficiency, and speed of transfer.

An area of blockchain-related interest is a use of "tokens" to represent and transfer assets via the blockchain. A token thus serves as an identifier that allows a real-world item to be referenced from the blockchain. Through an initial coin offering (ICO) model, startups may raise capital by issuing tokens on a blockchain, such as Ethereum, and distributing them to token buyers in exchange for making a financial contribution to a project. These tokens, which may be transferred across a network and traded on cryptocurrency exchanges, may serve a multitude of different functions, from granting holders access to a service to entitling them to company dividends. Depending on their function, tokens may be classified as security tokens or utility tokens.

Tokens may be used, for example in an initial public offering (IPO) to issue company shares, dividends, and voting rights over blockchain networks. The tokens may include security tokens and utility tokens. The security tokens may be associated with a value that is derived from a tradable asset and, thus, may be deemed a security token that may be subject to federal laws regulating traditional securities. In contrast, the utility tokens may represent future access to a company's product(s) or service(s). A defining characteristic of the utility token is that it is not designed as an investment. Because a utility token is not issued in a form of an investment asset, it may be exempt from having to comply with federal legislation regulating securities.

Further, similar to physical assets, the tokens that represent them may have many properties, one of which is fungibility or non-fungibility. In economics, fungibility refers to equivalence or interchangeability of each unit of a commodity with other units of the same commodity. Fungible tokens (FTs) are tokens that can be exchanged for any other token with the same value.

Fungible tokens are uniform, that is, FTs of the same type are identical in specification. In other words, each fungible token (FT) is identical to another FT of the same type, and FTs are divisible into smaller amounts. Similar to currency, where bills can be divided into coins of an equivalent value, FTs are divisible. As such, a fraction of an FT can be transferred between users. Nonfungible tokens (NFTs), however, cannot be replaced with other tokens of the same type. NFTs represent nonfungible assets, e.g., assets that have unique information or attributes. Each NFT is unique and differs from other tokens of the same class. For example, while plane tickets from and to a same destination may look the same, each one has a different passenger name, seat number, etc., and, therefore, is unique. In contrast to FTs, NFTs cannot be divided, an elementary unit of the NFT is the token itself.

Due to an immutable nature of transaction histories supported by blockchain networks, it is possible to extend the aforementioned validation steps of such transactions so that the transactions become subject to certain rules that reference prior transactions, or even aspects of an initial creation of a subject digital asset, e.g., NFT. An example of such rules is an arrangement wherein royalties are paid to a creator of a digital asset each time the digital asset is sold to a subsequent owner. Such royalty payment arrangements may be implemented as a function with which the blockchain network is programmed, or using a reference table loaded into a computer memory element of the blockchain network, as a smart contract as described hereinabove, or by other means.

A further use case for cryptocurrency exchanges on a blockchain network is that such exchanges can protect transactions—similar to a manner in which a surety bond would. A surety bond or surety is a promise by a surety or guarantor to pay one party a certain amount if a second party fails to meet some obligation, such as fulfilling terms of a contract. The surety bond protects an obligee against losses resulting from a principal's failure to meet the obligation. As cryptocurrencies evolve from fringe investments to mainstream instruments, surety bonds may become an increasingly common requirement for those looking to trade in virtual currencies.

Ordinary surety bonds act as a contract between three parties: (i) an entity requesting the bond (principal), (ii) the bond's beneficiary (obligee), and (iii) a company issuing the bond. What a surety bond does is guarantee that the principal will fulfill its obligations, whether it's completing a long-term project or processing a financial transaction, or else forfeit the bond. Cryptocurrency surety bonds work in the same basic manner, ensuring that the principal performs cryptocurrency transactions as expected, or else forfeits the bond. In this case, the contract is between an entity handling a virtual currency transaction, a regulatory entity requiring the surety bond, and a surety bond provider.

A composable digital asset integrates two or more individual digital assets into a new combined form, which may be referred to as an asset cluster. An asset cluster may comprise components of similar or different types. For example, an asset cluster may include an element of fungible currency such as cryptocurrency, along with a non-fungible token (NFT). Thus, combining an amount of cryptocurrency with an NFT may effectively establish a floor price for the NFT equal to the value of the fungible cryptocurrency.

Such composable assets may find applications in areas such as finance and gaming. An example embodiment of a gaming application of composable digital assets may involve a piece of armor having a socket, into which a gem may be placed, creating an asset cluster. Asset clusters may be decomposed at any time such that the NFT and the currency item again become separate entities on a digital exchange platform.

Composable digital assets may provide liquidity for any digital asset or token. For example, a player of a game incorporating composable digital asset clusters may use a currency component of a cluster to set an instantaneous price at which to sell the cluster, such as to an automated market maker (AMM) associated with the game. Composable assets may be referenced or required by contracts or rules governing transactions on a digital exchange platform, such as smart contracts.

An AMM may be configured to provide liquidity to a platform enabling exchange of digital assets as described herein. The exchange platform may be decentralized. Liquidity may be provided using underlying collateral. An AMM may take in and store different forms of digital assets, such as loans, to be used as collateral in future exchanges on the platform. Such assets may be aggregated within a collateral pool, such that liquidity is pooled in association with the exchange platform. Liquidity may thus be pooled and aggregated on a blockchain supporting the collateral pool. Assets may be withdrawn from the collateral pool upon minting a collateral token. The collateral token may thus consolidate liquidity for an exchange within one protocol or contract. In addition, the collateral token may provide liquidity for a one-to-one exchange with a user looking to sell or redeem a user-held token.

A cross-chain clearinghouse control system implemented upon a platform may be configured to force an exchange to be performed on the platform such that the exchange is managed by an AMM. A pricing function of the AMM may set a price for a collateral token, and may offer the collateral token for exchange at such a price, thus dictating a market price for that token, rather than deferring to market forces. The AMM may function with either a bounded or an unbounded token supply, providing continuous liquidity. In addition, the AMM may be configured to measure supply and demand for tokens on the platform, including the collateral tokens.

A digital asset marketplace may leverage a cross-chain clearinghouse control system to enforce a contract governing transfer of tokens between electronic wallets. The contract may specify royalties to be paid to an original creator of a token upon transactions involving that token. In addition, the contract may include a revenue share table. The cross-chain clearinghouse control system may be configured to enforce the contract regardless of network locations of two parties involved in a transaction, and regardless of whether or not the transaction is conducted within a digital asset marketplace. For example, even offline exchanges may be made transparently viewable from within the digital asset marketplace. The cross-chain clearinghouse control system may be configured to serve any token creator. The cross-chain clearinghouse control system may including a minimax recursive algorithm to facilitate a threshold value associate with the token.

In another embodiment, upon creation of a token, a threshold value of that token may be set within the digital asset marketplace. The cross-chain clearinghouse control system may implement rules in conjunction with the threshold value to prevent a value of the token from experiencing dramatic changes characteristic of backdoor or offline transactions. As such, the threshold value may act as a floor price of the token required to activate any transaction involving the token. The cross-chain clearinghouse control system may manage and approve or deny transactions accordingly. Rules such as threshold values may be based on a bounded percentage of a price change from a previous transaction. Such a cross-chain clearinghouse control system may be implemented in a decentralized manner, such as with a smart contract. A central authority is thus not required.

Certain embodiments may offer techniques for verifying or checking an identity that protect, preserve, and maintain privacy. Safeguarding privacy within blockchain networks is an important consideration for traditional institutions such as banks and other financial institutions that may desire to interact with and/or launch smart contracts, for example, as part of digital asset transactions, but may also need to keep trade secrets and/or sensitive customer information etc. confidential. As to the latter, such institutions may also be required to comply with rules and/or regulations including, but not limited to, the Europe Union's General Data Protection Regulation (GDPR) and the United States' Health Insurance Portability and Accountability Act (HIPAA), among other examples.

In an example embodiment, the cross-chain clearinghouse control system may be accomplished by use of, e.g., a "zero-knowledge proof" (ZKP). A zero-knowledge proof implementation in the cross-chain clearinghouse control system ensures enforcement of encoded rules configured in NFT assets utilizing a technique whereby a first entity (or "prover"), such as first transacting entity, a first wallet etc., may cryptographically prove to a second transacting entity (or "verifier") that the first entity possesses knowledge regarding certain information regarding the encoded rules in configured in the NFT, without also disclosing the actual contents of the information.

Zero-knowledge proofs may be interactive or non-interactive. An interactive ZKP requires interaction between a prover entity and a verifier entity involved in an NFT encoded rule enforcement transaction processed by the cross-chain clearinghouse control system. A non-interactive ZKP may be constructed from any interactive scheme by relying on, e.g., a Fiat-Shamir heuristic, or any other suitable technique known to those of skill in the art.

According to an embodiment, a protocol implementing ZKPs may be presented as a transcript where a prover (first entity) responds to interactive inputs from a verifier (second entity). In one such embodiment, the interactive input may be in the form of one or more challenges such that responses from the prover will convince the verifier if and only if a statement is true, e.g., if the prover does possess certain claimed knowledge.

In the context of blockchain networks, according to some embodiments, by employing a ZKP, the only information divulged on-chain is that some piece of undisclosed information is (i) valid and (ii) known by the prover with a high degree of certainty. As such, in an embodiment, zero-knowledge proofs may be used by various blockchains to furnish privacy-maintaining digital asset transactions, whereby, for example, a transaction's amount, sender electronic wallet identifier, and receiver electronic wallet identifier are kept secret. Furthermore, some embodiments relate to oracle networks that provide smart contracts with access to off-chain data and/or computing infrastructure. Such oracle networks may also employ ZKPs to prove a certain fact about off-chain data, without divulging the data itself on-chain. A method used for performing non-interactive ZKPs may be as described in D. Unruh, "Non-Interactive Zero Knowledge Proofs in the Random Oracle Model," in *EUROCRYPT* 2015, 2015, pp. 755-84, which is herein incorporated by reference in its entirety.

A digital wallet, such as a hybrid multisignature digital wallet may enable a licensed custodian or designee to provide signatures or keys required to approve a digital transaction. The custodian may approve transfers of tokens on digital exchange platforms such as blockchain platforms. A set of custodian signatures, potentially from multiple custodians, may be required to approve a transaction. Alternatively, the hybrid multisignature wallet may be configured in a one-of-many or a one-of-one setup, requiring only a single signature of one or more valid signatures from one or more custodians to approve the transaction. If a network allows a designated party to be a custodian, that party may enter into an agreement at a protocol level on the network to become a designated custodian. The hybrid multisignature wallet may be implemented in support of compliance operations. The custodian may facilitate recovery or replacement of lost signatures or keys, or of entire lost wallets.

The hybrid multisignature wallet may enable transactions such as token swaps, and may facilitate transfer of tokens across multiple networks. Individual networks of the multiple networks may implement rigorous or lenient constraints upon transactions performed within the respective networks. Thus, a disparity may exist between two networks involved in a token transfer. The custodian may facilitate management of such a disparity. The custodian may perform functions characteristic of an automated escrow service in conjunction with a digital exchange platform.

FIG. 1 is a block diagram of an example embodiment of a system 100 for enforcing conditional transfer of digital assets. The system 100 comprises a blockchain network 105-1, and another entity 105-2. Other entity 105-2 may be a second blockchain network where blockchain network 105-1 is a first blockchain network. Alternatively, other entity 105-2 may be a user of a marketplace platform, or a client device of such a user, with a location upon blockchain network 105-1 that differs from a holder of digital asset 120. In still other cases, other entity 105-2 may be a non-blockchain online entity, or even an offline entity such as a person acquainted with a holder of digital asset 120.

Continuing with respect to FIG. 1, blockchain network 105-1 includes multiple nodes 110-1, 110-2, through **110-*n*. It is assumed in FIG. 1 that n, the number of nodes in blockchain network 105-1, is greater than or equal to three; however, this may not always be the case, as embodiments may function with as little as two nodes 110-1, 110-2 in the multiple nodes of blockchain network 105-1, or even with a single node 110-1 instead of multiple nodes. At least a subset 110-1, 110-2 of the plurality of nodes 110-1, 110-2, through 110-*n* may be configured to provide digital wallet 115 enabling storage of digital asset 120 therein. It should be noted that any number of nodes less than n may comprise such a subset, and that, alternatively, all n nodes of blockchain network 105-1 may be configured to provide digital wallet 115**.

To continue, upon blockchain network 105-1 is implemented cross-chain clearinghouse control system 125 configured to (i) approve 145 a transfer of digital asset 120 from a first entity to a second entity if the transfer satisfies 140 the encoded preset rule 130 associated with digital asset 120 or (ii) disapprove 155 the transfer if the transfer does not satisfy 150 rule 130. In FIG. 1, the first entity is shown to be blockchain network 105-1 and the second entity is shown to be other entity 105-2. It should be noted, however, that multiple entities affiliated with blockchain network 105-1 may be enabled to act as the first and second entities, such that a transfer of digital asset 120 occurs among entities at different network locations on the same blockchain network 105-1. Alternatively, it should be noted that the first entity may in fact be other entity 105-2, and likewise the second entity may correspond to blockchain network 105-1, such that a transfer of digital asset 120 occurs from other entity 105-2 to blockchain network 105-1, in a direction opposite to that shown in FIG. 1. As such, one of the first and second entities may be or include digital wallet 115, which may be implemented upon blockchain network 105-1, while other entity 105-2 may be implemented separately from blockchain network 105-1.

In some embodiments of system 100, rule 130 specifies a royalty to be paid to a creator or prior owner of digital asset 120 upon transfer of digital asset 120. Similar to a configuration described above, blockchain network 105-1 may be a first blockchain network, and other entity 105-2 may be implemented upon a second blockchain network. In such embodiments, the first and second blockchain networks may be respectively configured to support first and second digital asset platforms. Similar to another configuration described above, other entity 105-2 may be implemented upon blockchain network 105-1 at a network location separate from a corresponding network location of an entity embodying or including digital wallet 115. In some configurations, other entity 105-2 may be an offline entity.

In some embodiments of system 100, the multiple nodes 110-1, 110-2, through **110-*n* may be configured to create a token representing digital asset 120. In some such embodiments, an encoded rule or condition 130 configured in the digital asset 120 may influence a price of digital asset 120. The encoded rule 130 configured in the digital asset 120 may include a threshold value pertaining to a price of digital asset 120. In some such embodiments, the encoded rule 130 configured in the digital asset 120 may implement a price floor for a transfer of digital asset 120. Alternatively, or in addition, rule 130 associated with digital asset 120 may require a price of digital asset 120** to remain within a bounded percentage of a price change from a prior transaction.

In some embodiments, blockchain network 105-1 may be decentralized. The rule 130 associated with digital asset 120 may include a smart contract. The digital asset 120 may be a non-fungible token (NFT).

Figure 2:
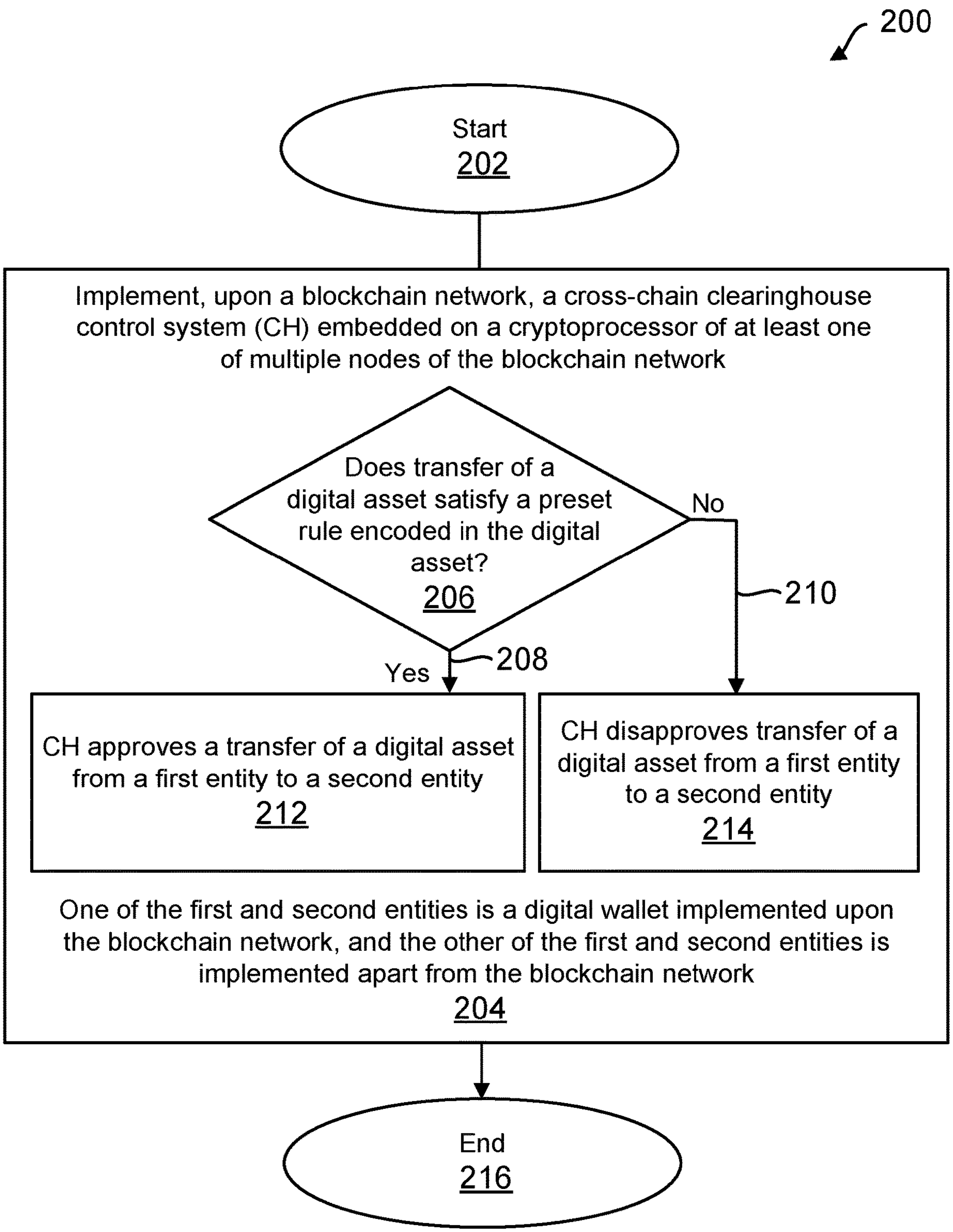
FIG. 2 is a flow diagram of an example embodiment of a computer-implemented method of enforcing conditional transfer of digital assets.

FIG. 2 is a flow diagram of an example embodiment of a computer-implemented method 200 of enforcing conditional transfer of digital assets such as digital asset 120. In some embodiments, method 200 starts 202 by implementing 204, upon a blockchain network such as blockchain network 105-1, a cross-chain clearinghouse control system 125. The cross-chain clearinghouse control system 125 may be configured to determine 206 whether a transfer of digital asset 120 from a first entity to a second entity satisfies a preset rule 130 encoded in digital asset 120. In response to the transfer satisfying 208 rule 130, cross-chain clearinghouse control system 125 approves 212 the transfer. Alternatively, in response to the transfer not satisfying 210 rule 130, cross-chain clearinghouse control system 125 disapproves 214 the transfer. The method 200 thereafter ends 216 in the example embodiment. In such embodiments, one of the first and second entities is a digital wallet 115 implemented upon blockchain network 105-1, and an other 105-2 of the first and second entities is implemented apart from the blockchain network.

In some embodiments of method 200 of FIG. 2, rule 130 may be configured to specify a royalty to be paid to a creator or prior owner of digital asset 120 upon transfer of digital asset 120. The rule 130 may be further configured to implement a fractionalized royalty model that requires enforcement of a distributed royalty arrangement. In addition, blockchain network may be a first blockchain network 105-1, and the other entity may be implemented upon a second blockchain network 105-2. According to such embodiments, method 200 may further include configuring the first 105-1 and second 105-2 blockchain networks to respectively support first and second digital asset platforms.

In some embodiments of method 200, other entity 105-2 may be implemented upon blockchain network 105-1 at a network location separate from a corresponding network location of an entity embodying or including digital wallet 115. In some configurations, other entity 105-2 may be an offline entity.

In some embodiments, method 200 may include creating a token representing digital asset 120, and establishing a threshold value pertaining to a transaction value of digital asset 120. A rule such as rule 130 may be configured to analyze such a threshold value. In some such embodiments, method 200 may further include implementing, via the threshold value, a transaction value floor for a transfer of digital asset 120. Alternatively, or in addition, method 200 may further include implementing a condition whereby the transaction value of digital asset 120 remains within a bounded percentage of a transaction value change from a prior transaction, wherein the threshold value is based on the bounded percentage.

In some embodiments, method 200 may use machine learning (ML) to establish a saddle point pertaining to digital asset 120. In this example, rule 130 may use a minimax model to compute minimum and maximum values for the token to establish a saddle point (maximin). For instance, a minimax ML engine/model may be used to determine minimum and maximum values according to an evaluation function for minimizing the possible loss for a worst case (maximum loss and maximum gain) scenario associated with the token. A blockchain system, e.g., system 100, for example, may automatically and adaptively select the saddle point of digital asset 120 using a maximin model of previous set saddle points of digital assets and potential ones. The model may look ahead at all possible values and make a decision for the digital asset.

In some embodiments, method 200 may include minting a token with built-in security features setting conditions regarding minimum and maximum mint amount, royalties, conditions about permissible computing locations as to where the token can be stored (on- or off-chain), and built-in features including randomness, rarity, and voting rights. For example, the token may be configured with custody security enabling it to be stored off-chain on a hardware security module (HSM). The HSM may create and hold private keys and secret keys securely so that they may not be extracted. The HSM may also provide an ability to perform some selected cryptographic operations with the keys.

In some embodiments of method 200, blockchain network 105-1 may be decentralized. The rule 130 associated with digital asset 120 may include a smart contract. The digital asset 120 may be a non-fungible token (NFT).

Figure 3:
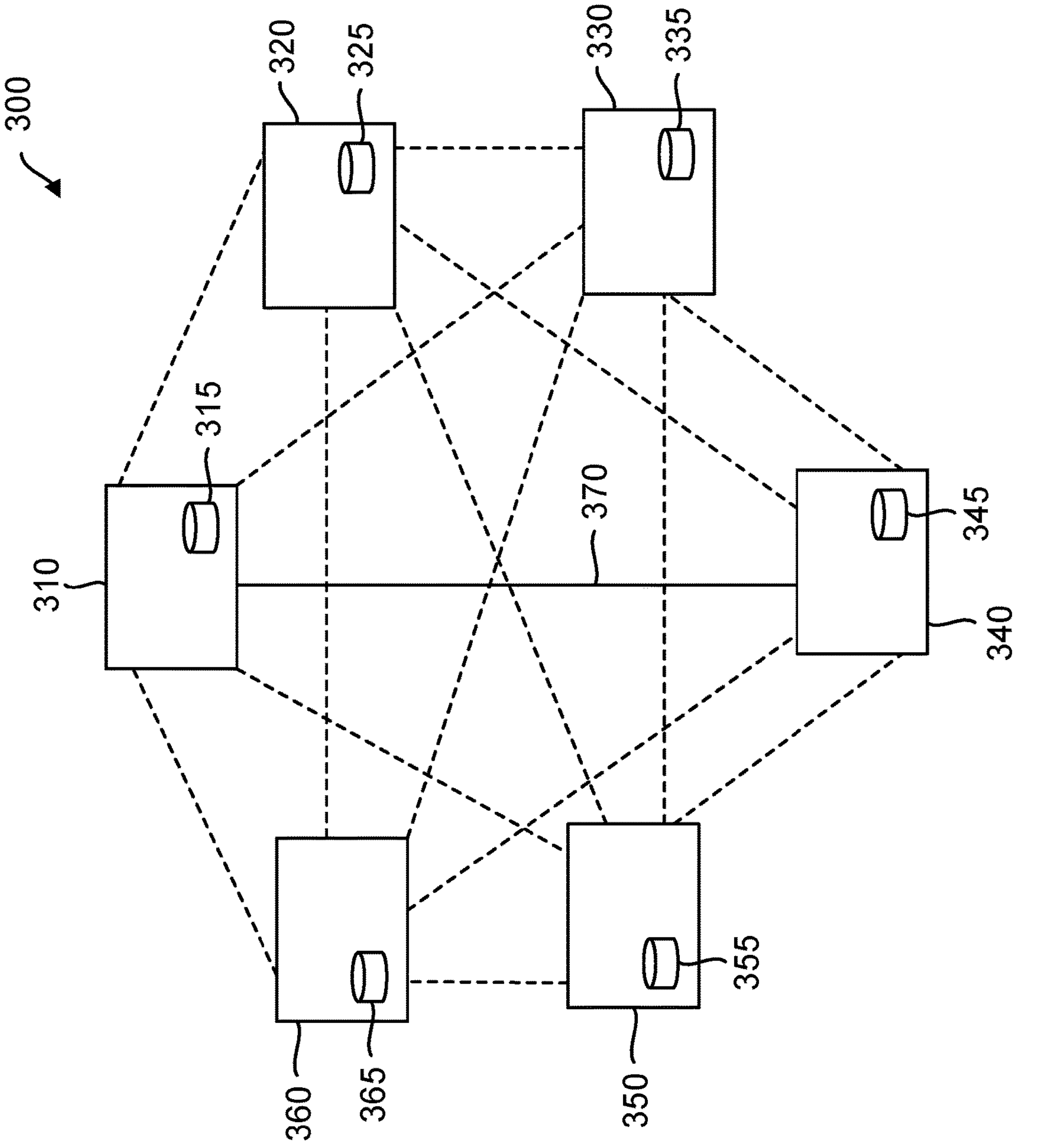
FIG. 3 is a simplified block diagram of an example embodiment of a distributed blockchain ledger computer-implemented system.

FIG. 3 is a simplified block diagram of an example embodiment of a blockchain network 300, also referred to interchangeably herein as a distributed ledger network 300, that may be accessed according to an example embodiment. The blockchain network 300 may be employed as blockchain network 105-1 and/or other entity 105-2 of FIG. 1, disclosed above. The blockchain network 300 is a distributed ledger peer-to-peer (P2P) network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 300 to transfer and record, in the form of blockchain based records, movement of tokens. Such blockchain based records form a cryptographically secured backlinked list of blocks.

The distributed ledger network 300 includes multiple computing devices configured as nodes 310, 320, 330, 340, 350, 360 of the distributed ledger network 300. Each node 310, 320, 330, 340, 350, 360 locally stores and maintains a respective identical copy 315, 325, 335, 345, 355, 365 of the blockchain ledger in memory communicatively coupled to the node. The nodes exchange messages within the distributed ledger network 300 to update and synchronize the ledger stored and maintained by each node. The nodes may also execute decentralized applications (decentralized apps or "dApps"), such as via smart contracts, for processing the messages. An example message transmission 370 from node 310 to node 340 may be used to exchange a token in the distributed ledger network 300 as shown in FIG. 3. Dotted lines between each set of nodes in the distributed ledger network 300 indicate similar transmissions that may be exchanged between any other set of nodes in the distributed ledger network 300. The messages may include a confirmed transfer for recording data associated with a token being transferred, a blockchain public key for each of one or more parties participating in the transfer.

Referring back to FIG. 1, according to an example embodiment, blockchain network 105-1 or other entity 105-2 may be an Ethereum network; however, it should be understood that blockchain network 105-1 and other entity 105-2 may be any suitable known blockchain networks. Ethereum is a decentralized network of computers with two basic functions: (i) a blockchain that can record transactions and (ii) a virtual machine (VM), that is, an Ethereum Virtual Machine (EVM), that can produce smart contracts. Because of these two functions, Ethereum is able to support decentralized applications (dApps). These dApps are built on the existing Ethereum blockchain, piggybacking off its underlying technology. In return, Ethereum charges developers for computing power in its network, which can only be paid in Ether, the only inter-platform currency. Depending on its purpose, a dApp may create ERC-20 (Ethereum Request for Comments 20) tokens to function as a currency. According to an example embodiment, fungible tokens (FTs) disclosed herein may be ERC-20 tokens or any other suitable FT known to those of skill in the art.

The code of the smart contract may be uploaded on the EVM, that may be a universal runtime compiler or browser, to execute the smart contract's code. Once the code is on the EVM, the code may be the same across each Ethereum node to be run to check whether the conditions are met, such as a condition for the balance reaching the trade value prior to expiration of the expiration term.

Ethereum has a long history of developed standards. For example, ERC-20 is a standard that defines a set of six functions that other smart contracts within the Ethereum ecosystem can understand and recognize. ERC-20 is a protocol standard and to be compliant with ERC-20, the functions need to be included in a token's smart contract. ERC-20 outlines a specific list of rules that a given Ethereum-based token must deploy, simplifying a process of programming the functions of tokens on Ethereum's blockchain. These include, for instance, how to transfer a token (by an owner or on behalf of the owner), such as may be employed for transferring fungible tokens (FTs) of a buyer, and how to access data (e.g., name, symbol, supply, balance, etc.) concerning the token, such as a value of digital asset 120 in digital wallet 115 (FIG. 1).

Alternatively, other entity 105-2 may be a non-blockchain online system or access point by which a party to a transaction involving a digital asset, e.g., digital asset 120, may connect to blockchain network 105-1. In still other cases, other entity 105-2 may be a user device other than a creator or owner of the digital asset, which transaction may thus take place in an offline manner.

Figure 4:
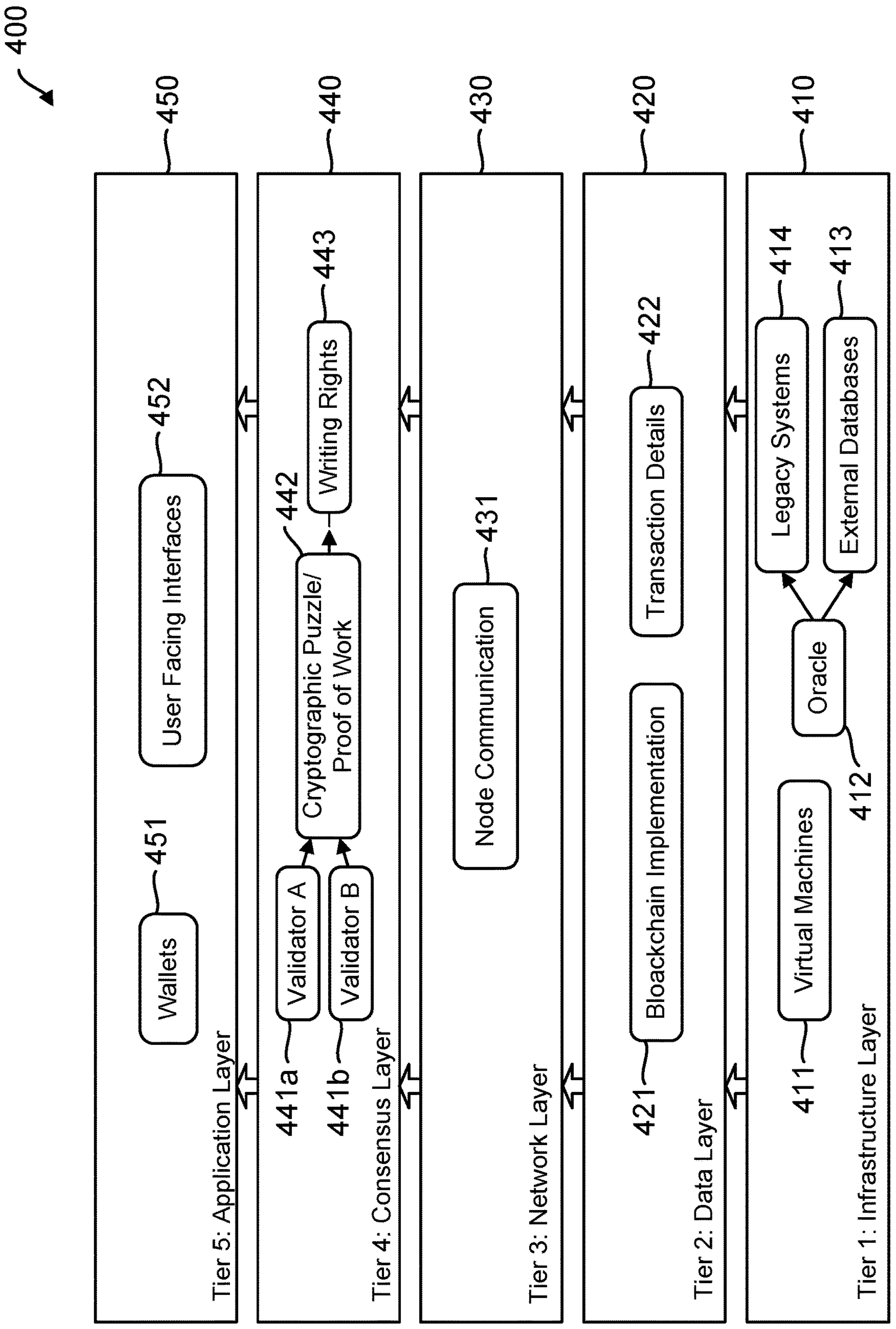
FIG. 4 is a simplified block diagram showing exemplary blockchain layers according to an embodiment.

FIG. 4 is a simplified block diagram showing exemplary blockchain layers 400 according to an embodiment. Blockchain layers 400 may include infrastructure (tier 1) layer 410, data (tier 2) layer 420, network (tier 3) layer 430, consensus (tier 4) layer 440, and application (tier 5) layer 450. The infrastructure layer 410 may be a hardware layer and may include one or more virtual machines (VMs) 411 and/or one or more oracles 412. A virtual machine (VM) 411 may provide a runtime environment for transaction execution in the blockchain. In an embodiment, a VM 411 may be, for example, stack-based and may enable untrusted code to be executed by a global peer-to-peer (P2P) network of computers. An oracle 412 may provide a third-party service that connects smart contracts executing on the blockchain with off-chain data sources. For example, an oracle 412 may query, verify, and/or authenticate one or more external data sources. According to an embodiment, external data sources may include, e.g., one or more legacy systems 414 and/or one or more external databases 413.

According to an embodiment, an oracle node architecture, e.g., oracle 412, may be provided to serve machine learning (ML) models for smart contracts on a blockchain. Such an architecture may be referred to as a "ML oracle." The ML oracle is useful to smart contract developers who want to incorporate ML models into their smart contracts. For example, a smart contract may distribute funds based on an algorithm, and the algorithm may include a ML model that forecasts sales of a product for a given week. The smart contract may invoke an inference call to a model on the ML oracle to obtain the forecast. As a further example, there are generative arts where the generative ML model may be an integral part of an artwork. Interaction with the model to generate new images may be part of a viewing experience. One well-known ML model type used by generative art is a generative adversarial network (GAN). Using the ML oracle, the ML model may become part of an NFT, thereby enabling an interactive viewing experience.

To summarize, in an embodiment, a smart contract may request an inference call to a ML model by identifying an ML model to call, such as by providing a hash value, and an input to the model. According to one such embodiment, a model file may be uploaded to, e.g., IPFS (InterPlanetary File System) or any other suitable known storage system, by a dApp developer and a model server may download the model file, e.g., using the hash value. For the ML model server to be generic enough to serve a wide range of models, it may also take as an input parameter a model type, e.g., PyTorch, TensorFlow, scikit-learn, or any other suitable known model type, as well as an input and output specification. The input may be data directly received from the calling smart contract, or it may be received indirectly via, e.g., an IPFS Uniform Resource Identifier (URI) or any other suitable identifier known to those of skill in the art. Similarly, the output may be sent back to the smart contract, or it may be uploaded to any suitable known storage system, including, but not limited to IPFS, and the, e.g., URI, may be sent to the smart contract. For example, a forecasting model may use the direct input/output method. An indirect input/output method employing a known storage system such as IPFS may be commonly used by computer vision/imaging models, among other examples.

In an example embodiment, system 100 (FIG. 1) may include a virtual machine (VM), e.g., VM 411 (FIG. 4), with a blockchain oracle, e.g., oracle 412.

Continuing with FIG. 4, data layer 420 may interface with infrastructure layer 410 and may include blockchain implementation 421 and transaction details 422. A blockchain is a decentralized, massively replicated database (distributed ledger), where transactions are arranged in blocks, and placed in a P2P network. The blockchain implementation 421 may include a data structure represented, for example, as a linked list of blocks, where transactions are ordered. The blockchain implementation 421's data structure may include two primary components—pointers and a linked list. Pointers are variables that refer to a location of another variable, and a linked list is a list of chained blocks, where each block has data and pointers to the previous block. Each block may contain a list of transactions that happened since a prior block. Transaction details 422 may contain information about transactions occurring on the blockchain.

The network layer 430 may interface with data layer 420 and may also be referred to as a P2P layer or propagation layer. One purpose of network layer 430 may be to facilitate node communication 431, such that nodes can discover each other and can communicate, propagate, and synchronize with each other to maintain a valid current state of the blockchain. A distributed P2P network, e.g., network layer 430, may be a computer network in which nodes are distributed and share the workload of the network to achieve a common purpose. Nodes in network layer 430 may carry out the blockchain's transactions.

The consensus layer 440 may interface with network layer 430 and may ensure that blocks are ordered, validated, and guaranteed to be in the correct sequence. A set of agreements between nodes in a distributed P2P network may be established by the consensus layer 440. The agreements result in consensus protocols or algorithms, which correspond to rules that nodes follow in order to validate transactions and create blocks in accordance with those rules. To validate a transaction, a validator, e.g., validator 441*a* or validator 441*b*, may perform a consensus algorithm, such as proof of work 442 or any other suitable algorithm known in the art. Performing the consensus algorithm may involve expending computational resources to solve a cryptographic puzzle 442. After being validated according to a consensus algorithm, a transaction may be written to the blockchain through a process of writing rights 443.

The application layer 450 may interface with consensus layer 440 and may include customized applications and services, such as electronic wallets 451. Further, application layer 450 may include (not shown): smart contracts, chaincode, and decentralized apps (dApps). The application layer 450 may also include applications utilized by end users to interact with the blockchain. Such applications may be, e.g., one or more user facing interfaces 452. Further, such applications may include, for example (not shown): scripts, application programming interfaces (APIs), and frameworks.

Figure 5:
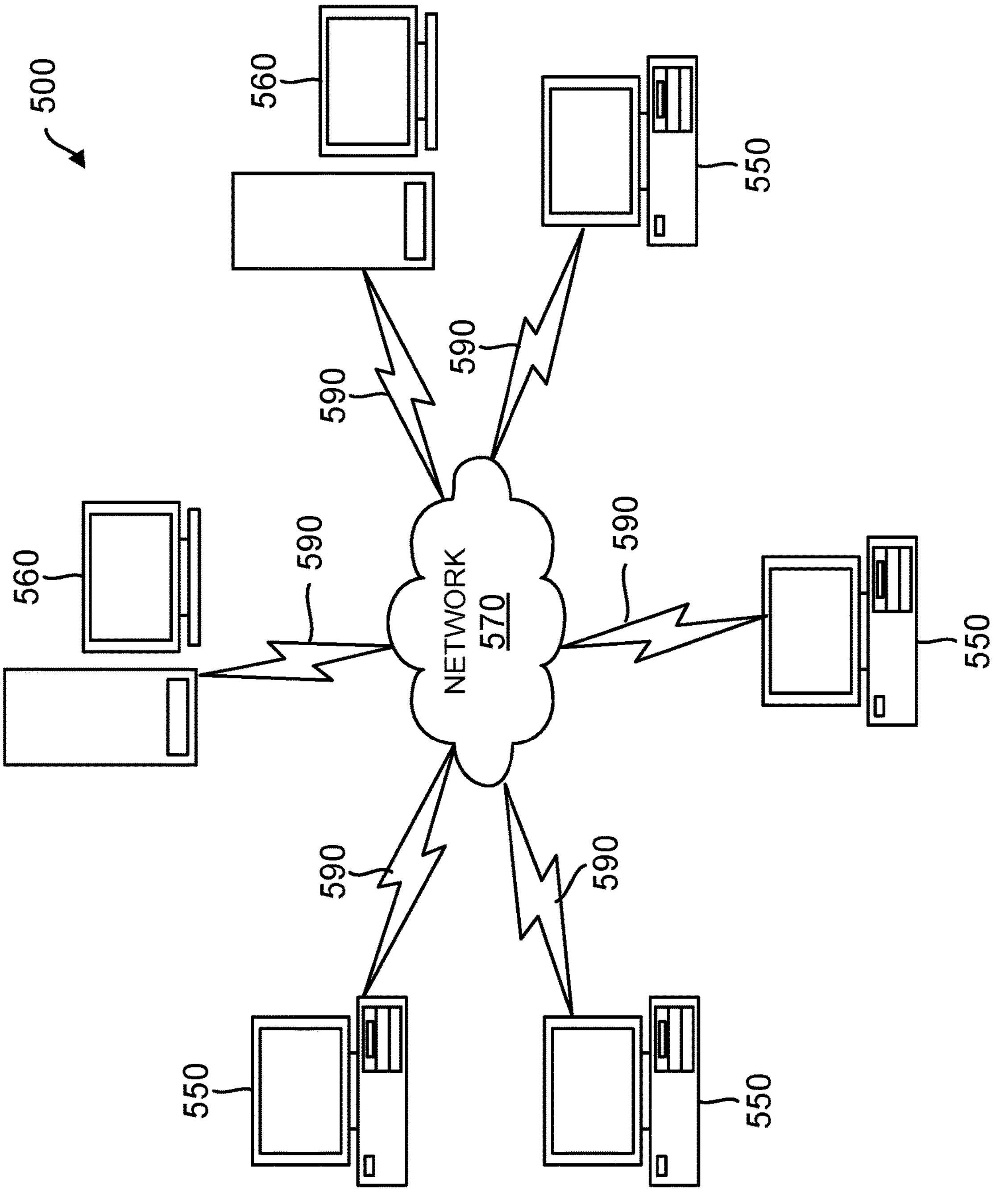
FIG. 5 is a simplified block diagram of an example implementation of a network in communication with an embodiment.

An example implementation of system 100 (FIG. 1) may be implemented in a software, firmware, or hardware environment. FIG. 5 illustrates one such example digital processing environment 500 in which embodiments of system 100 may be implemented. Client computer(s)/device(s) 550 and server computer(s)/device(s) 560 provide processing, storage, and input/output (I/O) devices executing application programs and the like.

Figure 6:
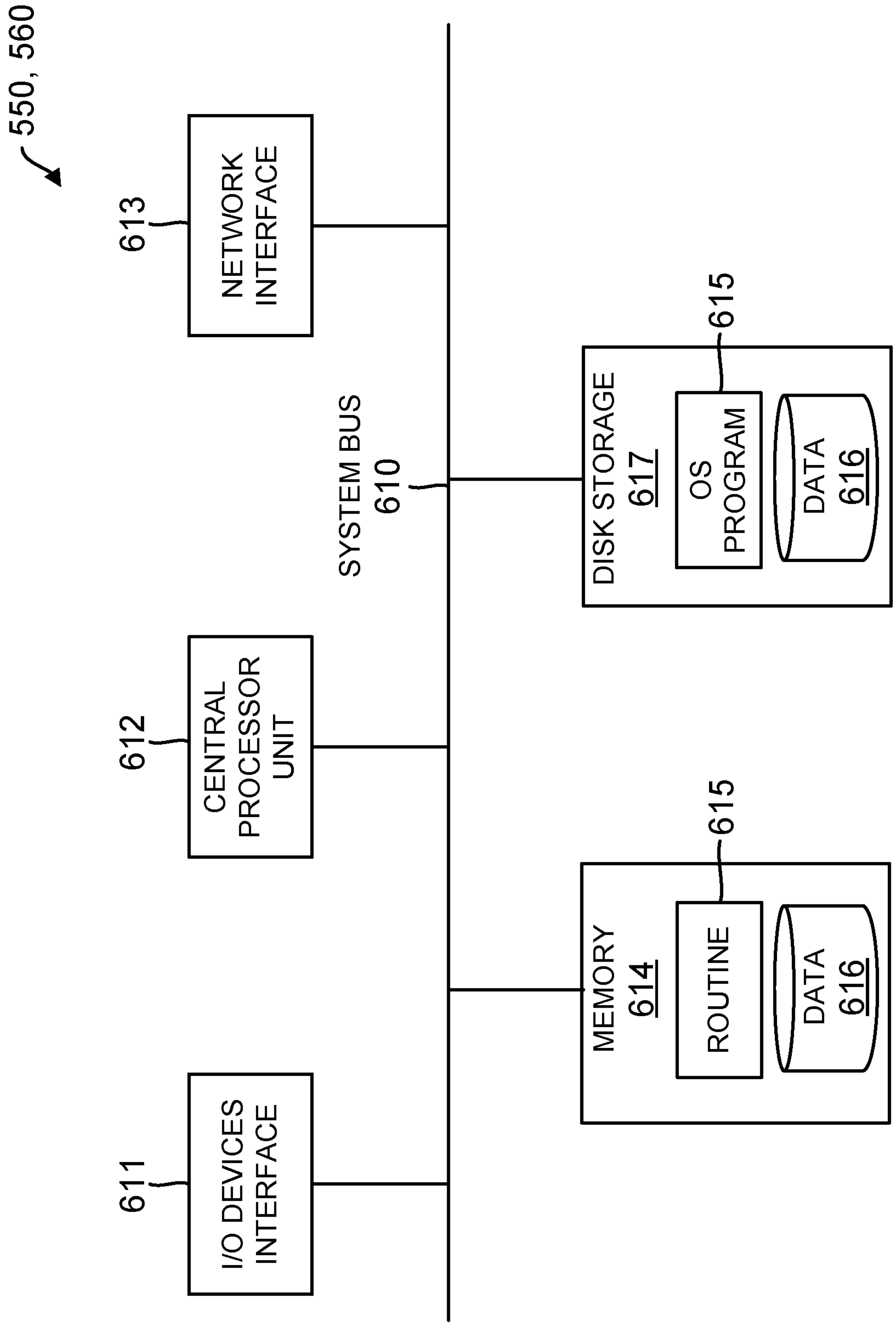
FIG. 6 is a simplified block diagram of any internal structure of a computer/computing node in a processing environment of an embodiment.

Client computer(s)/device(s) 550 may be linked 590 directly or through communications network 570 to other computing devices, including other client computer(s)/device(s) 550 and server computer(s)/device(s) 560. Referring to FIGS. 5 and 6 (the latter described in more detail hereinbelow), network 570 utilizes system 100 according to an embodiment of the invention, for enforcing conditional transfer of digital assets, e.g., digital asset 120 (FIG. 1).

The communication network 570 may be part of a wireless or wired network, a remote access network, a global network (e.g., the Internet), a worldwide collection of computers, local area networks (LANs) or wide area networks (WANs), and gateways, routers, and switches that may use a variety of known protocols (e.g., TCP/IP, Bluetooth®, etc.) to communicate with one another. Communication network 570 may also be a virtual private network (VPN) or an out-of-band (00B) network or both. Further, communication network 570 may take a variety of forms, including, but not limited to, a blockchain network, a distributed ledger network, a data network, voice network (e.g., landline, mobile, etc.), audio network, video network, satellite network, radio network, and pager network. Other known electronic device/computer network architectures are also suitable. For example, client computer(s)/device(s) 550 may include nodes shown in FIG. 3, which run user applications that enable a user to communicate with an application to determine whether a user meets a work requirement. A blockchain network, such as blockchain network 105-1 (FIG. 1), may be configured on each user device 310, 320 (FIG. 3) to store tokens. Client computers 350 (FIG. 3) of the computer-implemented system 100 (FIG. 1) may be configured with a trusted execution environment (TEE) or trusted platform module (TPM), where the application may be run and digital assets, e.g., digital asset 120, and/or tokens may be stored.

Referring again to FIG. 5, server computer(s)/device(s) 560 of the computer-implemented system may be configured to include a server that that executes the application. For example, the application of server computer(s)/device(s) 560 may determine whether a user has satisfied a work requirement and produce a determination result and pair, in computer memory, e.g., memory 614 (FIG. 6), an indication of the determination result with an identifier of the user or an identifier of a digital asset of the user, such as an address of a node of a blockchain network accessible by the user. The application of server computer(s)/device(s) 560 also facilitates a transfer of a collateral token by moving the collateral token to, for example, a digital wallet, e.g., digital wallet 115 (FIG. 1), implemented upon a blockchain network. For another example, server computer(s)/device(s) 560 or client computer(s)/device(s) 550 may comprise peer computing devices (nodes) 310, 320, 330, 340, 350, 360 of a distributed blockchain ledger 300 of FIG. 3, which use smart contracts to execute and record transactions implemented via tokens.

FIG. 6 is a block diagram of any internal structure of a computing/processing node (e.g., client computer(s)/device(s) 550 or server computer(s)/device(s) 560) in the processing environment 500 of FIG. 5, which may be used to facilitate displaying audio, image, video, or data signal information. Each computer/device 550, 560 in FIG. 6 may contain a system bus 610, where a bus is a set of actual or virtual hardware lines used for data transfer among components of a computer or processing system. System bus 610 may essentially be a shared conduit that connects different elements of a computer system (e.g., processor, disk storage, memory, I/O ports, etc.), thereby enabling transfer of data between elements or components.

Continuing with FIG. 6, attached to system bus 610 is an I/O device interface 611 for connecting various input and output devices (e.g., keyboard, mouse, touch screen interface, displays, printers, speakers, audio inputs and outputs, video inputs and outputs, microphone jacks, etc.) to a computer/device 550, 560. Network interface 613 may allow a computer/device to connect to various other devices attached to a network, for example network 570 of FIG. 5. Memory 614 may provide volatile storage for computer software instructions 615 and data 616 used in some embodiments to implement software modules/components of system 100 (FIG. 1).

Software components 615, 616 of system 100 (e.g., cross-chain clearinghouse control system 704, a minimax recursive algorithm, encoder/decoder, Trusted Execution Environment (TEE), blockchain layer 1 virtual machine (VM), oracle, wallet interface, applets, authentication site, cybersecurity controller, service applications, and the like) described herein may be configured using any programming language known in the art, including any high-level, object-oriented programming (OOP) language, such as Python or Solidity. The computer-implemented system may include instances of processes that enable execution of transactions and recordation of transactions. It should be understood that the terms "transaction" and "exchange" are herein used interchangeably, when used within a context of digitally transferring items of value, such as digital assets (e.g., digital asset 120 (FIG. 1)), collateral assets, and/or collateral tokens, among entities associated with a blockchain network, e.g., blockchain network 105-1 (FIG. 1). The computer-implemented system 100 may also include instances of encoders/decoders, which can be implemented by, e.g., a server 560 or a client that communicates with the server 560, using, for example, secure sockets layer (SSL), Hypertext Transfer Protocol Secure (HTTPS), or any other suitable protocol known to those of skill in the art.

In an example mobile implementation, a mobile agent implementation of embodiments may be provided. A client-server environment may be used to enable mobile services using a network server, e.g., server 560. It may use, for example, the Extensible Messaging and Presence Protocol (XMPP) protocol, or any other suitable protocol known to those of skill in the art, to tether an engine/agent 615 on a user device 550 to a server 560. The server 560 may then issue commands to the user device on request. The mobile user interface framework to access certain components of computer-implemented system 100 (FIG. 1) may be based on, e.g., XHP, Javalin, and/or Wireless Universal Resource FiLe (WURFL), or other suitable known framework(s), interface(s), or combinations thereof. In another example mobile implementation for the iOS operating system (OS) and its corresponding application programming interface (API), the Cocoa Touch API may be used to implement the client-side components 615 using Objective-C or any other suitable known high-level OOP language that adds Smalltalk-style messaging to the C programming language.

Disk storage 617 may provide non-volatile storage for computer software instructions 615 (equivalently "OS program") and data 616 may be used to implement embodiments of system 100. The system may include disk storage accessible to a server computer 560. The server computer may maintain secure access to records associated with system 100. Central processing unit (CPU) 612 may also be attached to system bus 610 and provide for execution of computer instructions. In one example embodiment, the CPU 612 is a secure cryptoprocessor implemented as a dedicated microprocessor configured to execute the cross-chain clearinghouse control system. The cryptoprocessor may be specialized to execute cryptographic algorithms within hardware to support the cross-chain clearinghouse control system. Functions include such things as accelerating encryption algorithms that verify compliance of encoded rules related to an NFT asset, enhanced tamper, and intrusion detection, enhanced data, key protection and security enhanced memory access and I/O to facilitate transactions across multiple blockchain systems.

In some embodiments, processor routines 615 and data 616 may be computer program products. For example, aspects of system 100 may include both server-side and client-side components.

In other embodiments, authenticators/attesters may be contacted via, e.g., blockchain gaming systems, instant messaging applications, video conferencing systems, VoIP (voice over IP) systems, etc., all of which may be implemented, at least in part, in software 615, 616. Further, in yet other embodiments, client-side components interfacing with system 100 may be implemented as an application programming interface (API), executable software component, or integrated component of the OS configured to provide access to an electronic wallet on a Trusted Platform Module (TPM) executing on a client device 550.

In one embodiment, the cross-chain clearinghouse control system is implemented as an embedded virtual machine, preferably executing on one or more cryptoprocessors configured to support efficient and scalable processing of application-to-blockchain and blockchain-to-blockchain transactions. The cryptoprocessor may be a dedicated computer-on-a-chip or microprocessor for carrying out cryptographic transaction operations, embedded in a hardware security module with security measures providing failsafe tamper resistance. The embedded cryptographic processor can be configured to output decrypted data onto a bus in a secure environment, in that embedded cryptoprocessor does not output decrypted data or decrypted program instructions in an environment where security cannot be maintained. The embedded cryptoprocessor does not reveal keys or executable instructions on a bus, except in encrypted form, and zeros keys by attempts at probing or scanning.

In an embodiment, software implementations 615, 616 may be implemented as a computer-readable medium capable of being stored on a storage device 617, which provides at least a portion of the software instructions for system 100. Executing instances of respective software components of system 100, such as instances of system 100, may be implemented as computer program products 615, and may be installed by any suitable software installation procedure, as is well known in the art. In another embodiment, at least a portion of the system software instructions 615 may be downloaded over a wired and/or wireless connection via, for example, a browser SSL session or through an app (whether executed from a mobile or other computing device). In other embodiments, system 100 software components 615 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s) known in the art).

In one embodiment, the cross-chain clearinghouse control system is implemented as an embedded virtual machine, preferably executing on one or more cryptoprocessors configured to support efficient and scalable processing of application-to-blockchain and blockchain-to-blockchain transactions. The cryptoprocessor may be a dedicated computer-on-a-chip or microprocessor for carrying out cryptographic transaction operations, embedded in a hardware security module (HSM) with security measures providing failsafe tamper resistance. The embedded cryptographic processor can be configured to output decrypted data onto a bus in a secure environment, in that embedded cryptoprocessor does not output decrypted data or decrypted program instructions in an environment where security cannot be maintained. The embedded cryptoprocessor does not reveal keys or executable instructions on a bus, except in encrypted form, and zeros keys by attempts at probing or scanning.

An example embodiment includes device code executed in a TEE or TPM. A TEE or TPM is a hardware environment that runs instructions and stores data outside a main operating system (OS) of a device. This protects sensitive code and data from malware or snooping with purpose-built hardware governed by an ecosystem of endorsements, beginning with a device manufacturer. The system may perform checks on the TEE or TPM, such as executing BIOS (Basic Input/Output System) checks, to verify that folders (e.g., wallets, such as digital wallet 115 (FIG. 1)) stored in the TEE/TPM have not been altered by malicious actors.

Figure 7A:
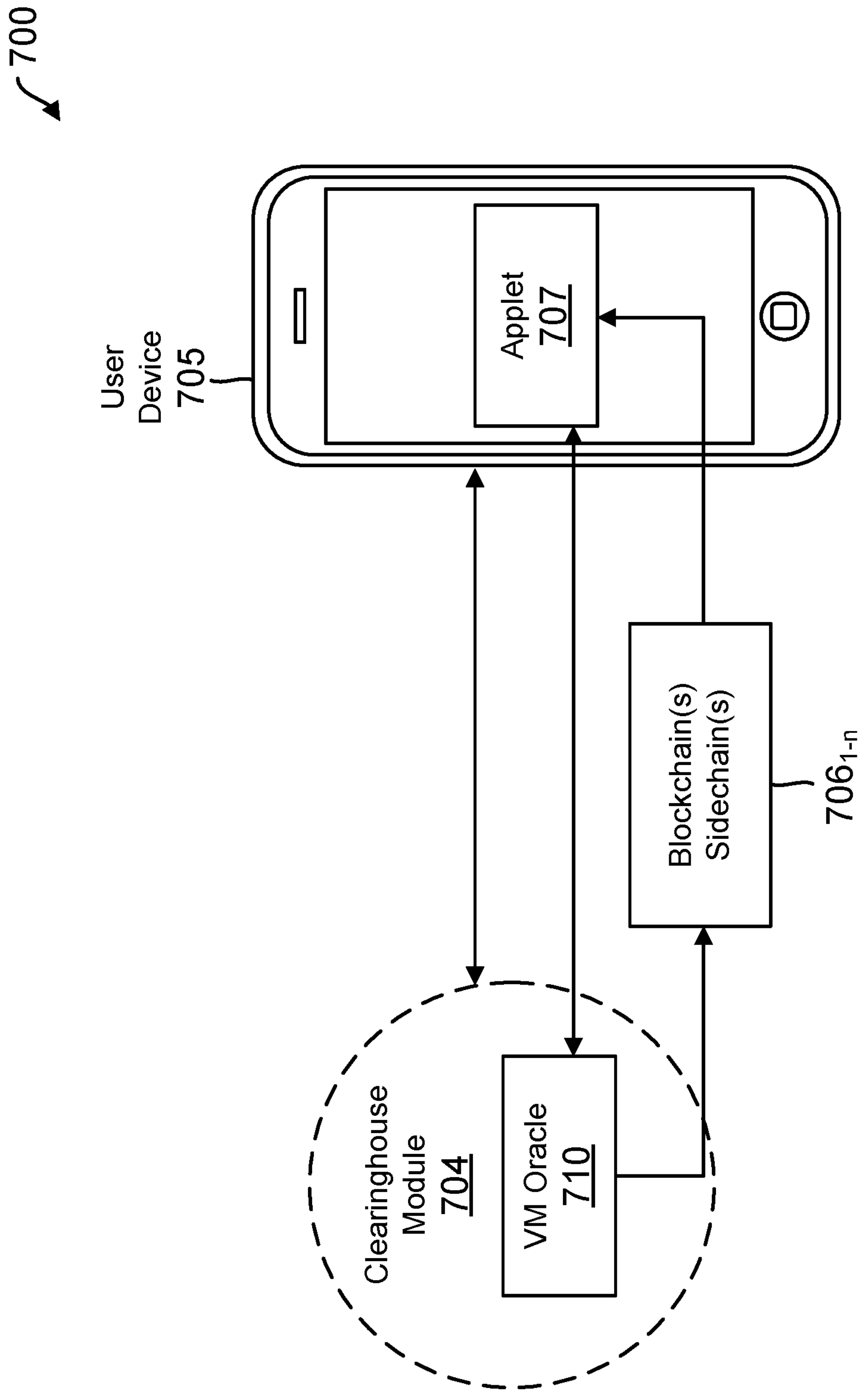
FIG. 7A is a simplified block diagram showing an example device authentication system according to an embodiment.

FIG. 7A is a simplified block diagram showing an example device authentication system 700 with components upon which system 100 (FIG. 1) may operate according to an embodiment. With these system components 700, network nodes may make use of hardened encryption and the cryptographic key in endpoint user devices 705 through an API 704*a* to a cross-chain clearinghouse control system. The user devices 705 may provide processing, storage, and input/output devices executing application programs and the like. In addition, further services may be provided built on these system components 700 for device management, backup, attestation, etc. To support system 100, the registration of identity cryptographic keys and a set of device management services for attestation, backup, and device grouping, are managed. The system components 700, e.g., cryptographic key wallet 714, may also interface with applet 709.

It would be the intent of system 700 not to maintain mission critical data as in conventional approaches, but rather to provide a platform for seamless, yet secure, connections between cross-chain clearinghouse control system 704 and user devices 705. On one end of the system is the VM oracle 710 that prepares an instruction for a user device 705 and at the other is system 700 which is applet 707 that can act on that instruction. A protocol may define how these instructions and replies are constructed.

According to an embodiment, system 700 may illustrate binding between the digital asset and multiple parties/devices. The system 700 may lock features of identity, transaction and attestation to the hardware of respective user devices 705.

Figure 7B:
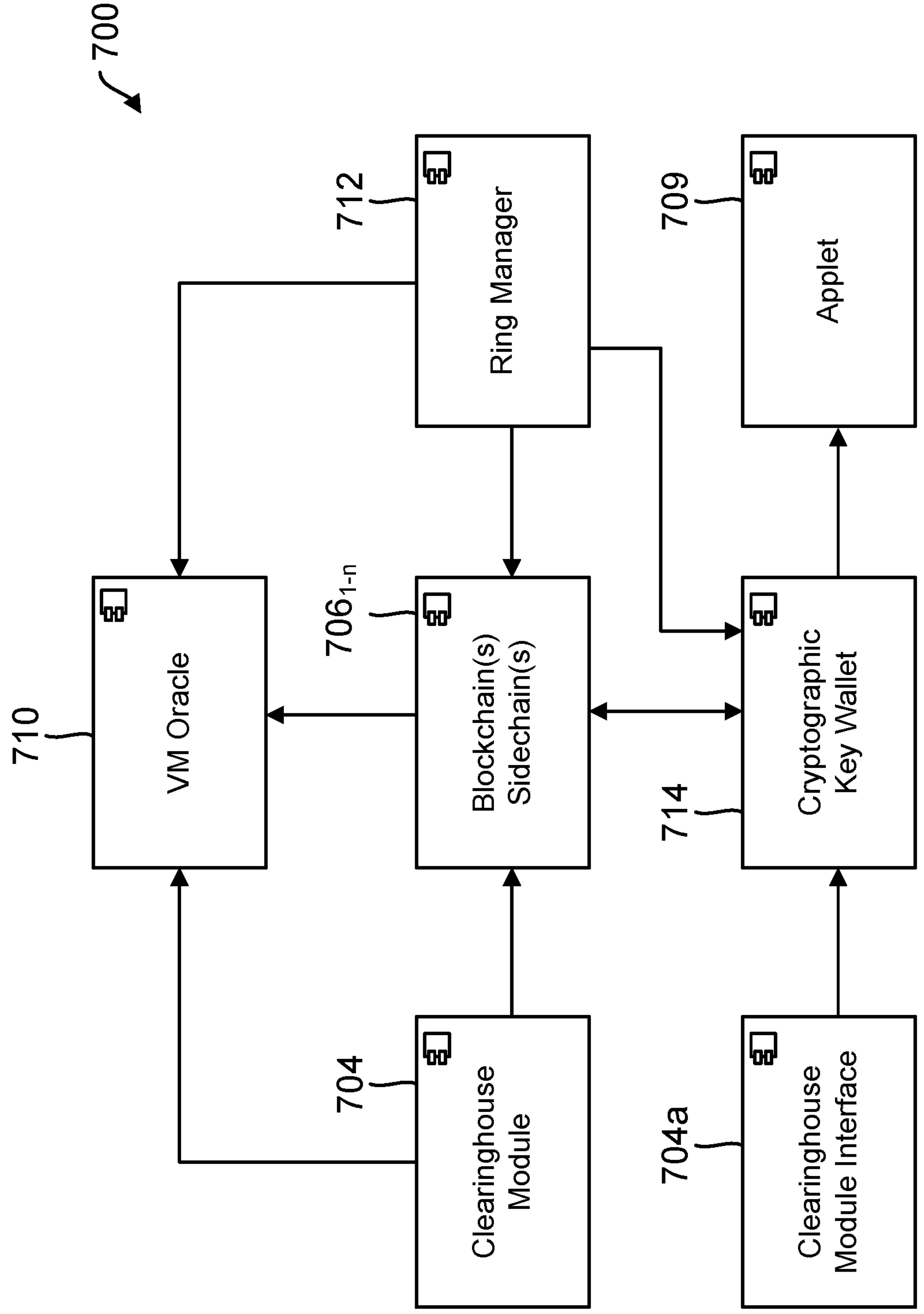
FIG. 7B is a diagram showing example system components for the example device authentication system according to an embodiment.

In an embodiment, system 700, shown in FIG. 7B, may use a secure socket, e.g., SSL or HTTPS, to maintain a persistent connection with devices. This channel is used for pairing and other administrative functions. VM oracle 710 may be provided to/utilized on blockchain networks for simplifying the encoding of a transaction. This VM oracle 710, for example, could be implemented in a programming language, such as a high-level, OOP language with dynamic semantics like Python.

A TEE may be implemented in a user device hardware security chip separate execution environment that runs alongside the rich operating system, and provides security services to that rich environment. The cryptographic keys and/or digital assets, collateral assets, or collateral tokens may be stored in the TEE. The TEE offers an execution space that provides a higher level of security than a rich OS. The TEE may be implemented as a virtual machine (VM), on the user devices, or on the network nodes.

The ring manager 712 can be implemented as a service provided to end-users for managing rings (or clusters) of user devices 705. User devices 705 may be grouped into a single identity and used to backup and endorse each other. Rings may be associated with other rings to create a network of devices. The rings may be a collection of individual device public keys (as opposed to a new key). If there are not many shared devices in the network, the list of devices may be short because of the potential for increased computational and bandwidth resources that may expended, and may introduce a time cost for encrypting a transaction with all cryptographic keys on a device list.

In an example embodiment, the device TEE 708 is a software program that executes in a hardware secured TEE. The device TEE 708 is specially designed to execute cryptographic functions without compromise from malware or even the device operator. OEM (Original Equipment Manufacturer) 723 is the entity that built the user device and/or a Trusted Application Manager (TAM) authorized to cryptographically vouch for the provenance of the device.

Figure 7C:
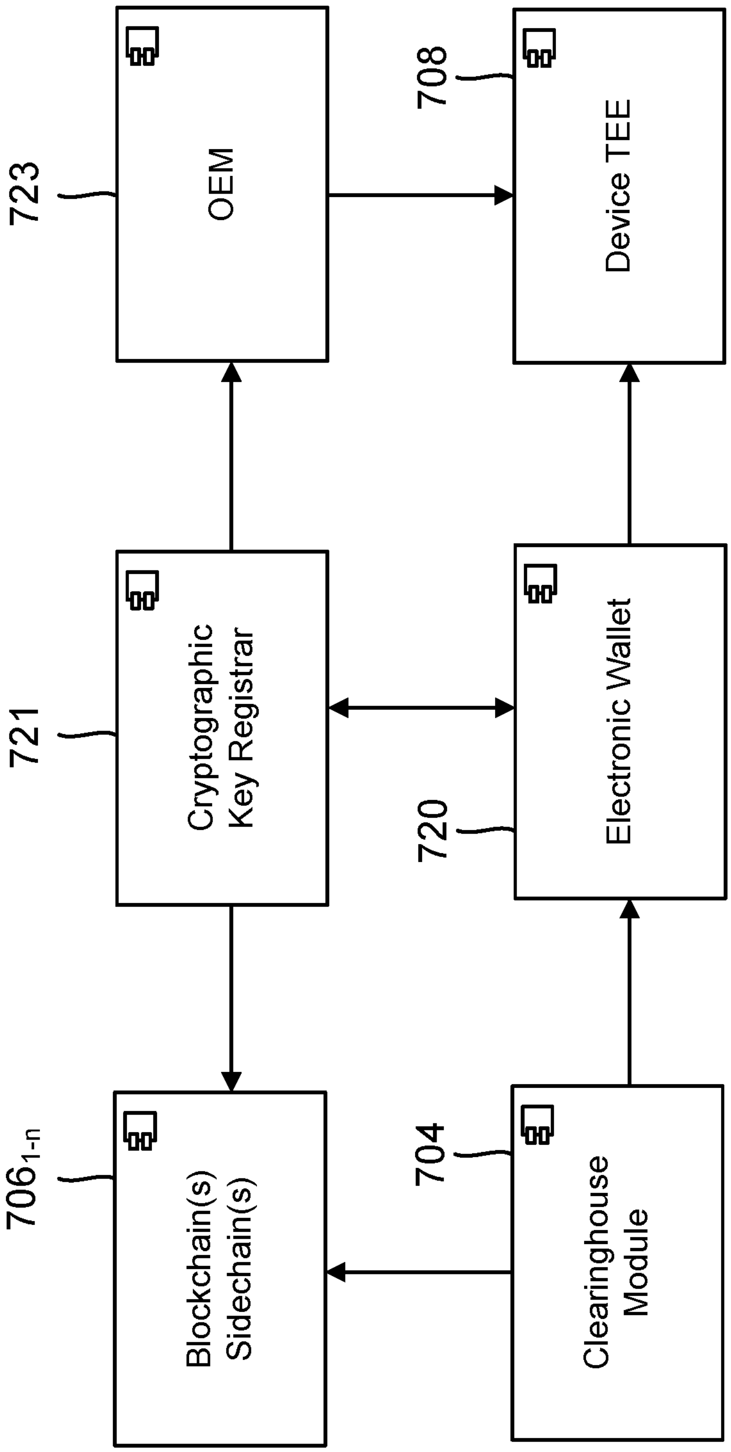
FIG. 7C is a diagram of the example device authentication system coupled with the example system components according to an embodiment.

In an embodiment, when the electronic wallet 720 shown in FIG. 7C runs for the first time to process an NFT, it will ask the device TEE 708 to generate the cryptographic key. Each digital asset is signed by the node that deposits the asset into a locker with their signature and is thereby locked. For a node to then interact with the asset on the network on which it is locked, the node must unlock the asset with a cryptographic signature. Registration may involve confirmation from the device operator. The registrar may ask the device for a Device Measurement Record which includes one or more of the following: a composite value of the Platform Configuration Registers (PCRs) generated by the boot process, BIOS version, OS version, GPS (Global Positioning System) location, among other examples. This data may be signed by the cryptographic key. It may be further signed by the registrar. The resulting data set may become the gold reference or reference value for future integrity checks. Confirmation from the device operator may be required in collecting the gold reference or reference value. This data set may be posted into a public cryptographic ledger. The public record may establish cryptographic proof of the time of registration along with the endorsement of the registrar. The registration may further include attribute data, such as location or company name or device make/model. The registration may reference a signed document that sets out the policy terms of the registrar at the time of registration. The cryptographic key registrar 721, or another trusted integrity server, may create a blockchain account key (a public/private key pair) that can be referenced as a signatory in a multi-signature transaction on the blockchain. A signatory may indicate that the value represented in the blockchain transaction cannot be spent or transferred unless co-signed by the registrar.

The blockchain(s)/sidechain(s) 706$_{1\text{-}n}$ may be a JSON (JavaScript Object Notation) API written in Python, which uses the third-party agent/process private key to enroll the identity cryptographic keys of devices 705 and system 700. During enrollment, the public key of the user device 705 or system 700 is recorded by the TEE applet 708. Enrollment enables the TEE applet 708 to pair a device 705 with cross-chain clearinghouse control system 704. In one embodiment, the result of pairing is that a user device 705 has a service public key, endorsed by a third-party agent/process and can therefore respond to cross-chain clearinghouse control system 704 instructions.

Figure 7D:
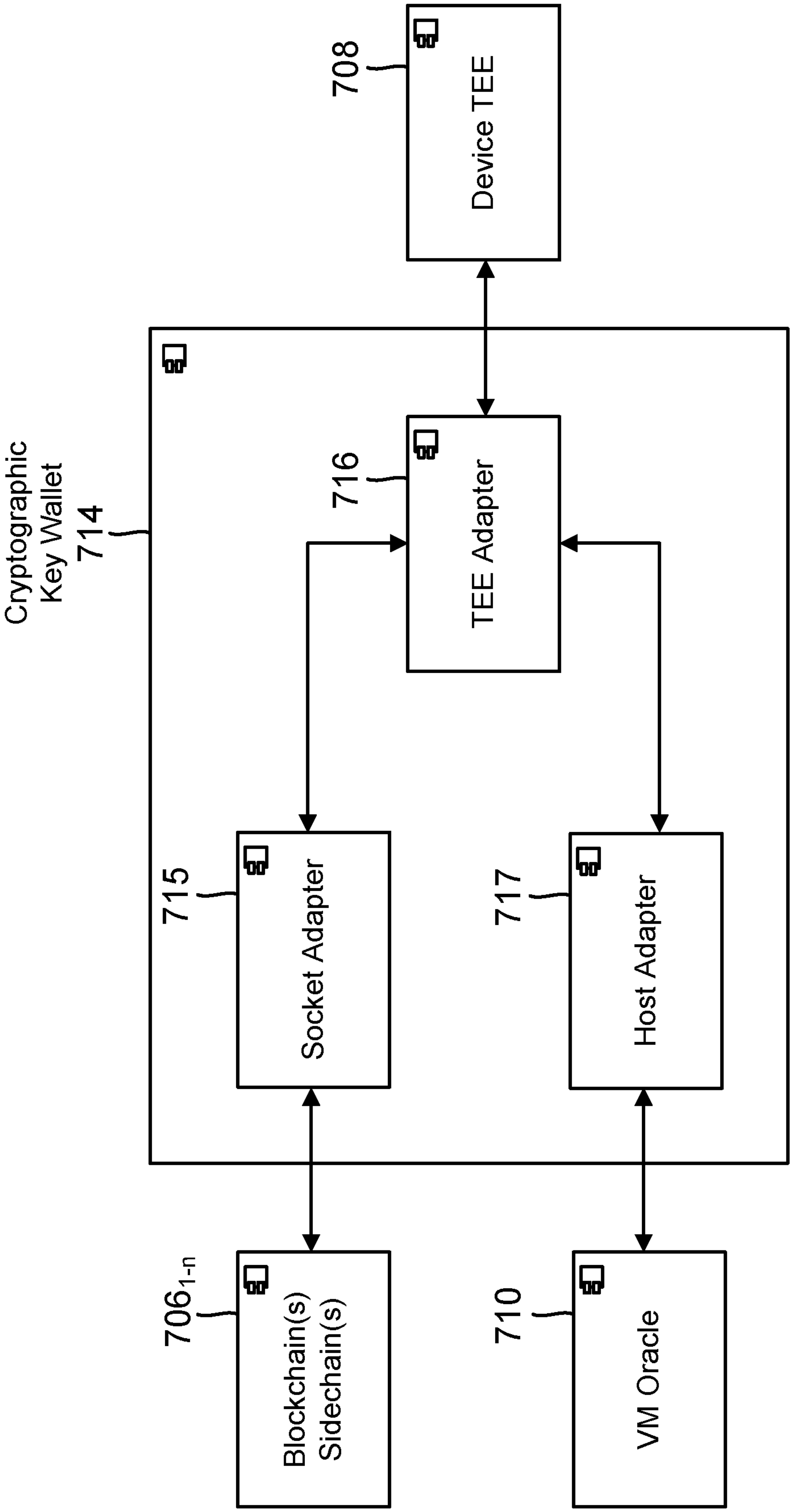
FIG. 7D is a diagram of the example device authentication system adaptor and its outward and inward-looking interfaces according to an embodiment.

In an embodiment, the cryptographic key wallet 714 of FIG. 7B may be composed of outward and inward-looking interfaces as shown in FIG. 7D. The inward-looking interface, the TEE adapter 716, handles proprietary communications with system 700. The host adaptor 717 is provided to expose services to third-party applications. The host adaptor 717 may present the interface of the cryptographic key wallet 714 through different local contexts, such as browsers or system services. Multiple realizations for diverse contexts are anticipated. The socket adaptor 715 may connect the client environment blockchain(s)/sidechain(s) 706$_{1\text{-}n}$. The TEE adaptor 716 may be the glue that pipes commands into system 700. The cryptographic key wallet 714 may prepare message buffers that are piped to system 700, and then synchronously awaits notification of a response event. The host adaptor 717 may isolate the TEE adapter 716 from the host environment. The host adaptor 717, in an embodiment, may operate in a potentially hostile environment. The host adaptor 717's role may be to facilitate easy access to the system 700. Instructions from a cross-chain clearinghouse control system 704 intended for system 700 may be signed by cross-chain clearinghouse control system 704 and then passed through to the TEE adapter 716 and system 700.

The blockchain(s)/sidechain(s) $706_{1-n}$ may have a special capability of being able to pair additional instances of cross-chain clearinghouse control systems with device 705. Communications with the first blockchain(s)/sidechain(s) $706_{1-n}$ may be handled through the web API and preferably are authenticated. In one example, this is implemented with an API key. This may be implemented using an SSL key swap. In some embodiments, all requests are signed.

The system 700 provides robust security. The digital locker may be used to make it more difficult for an attacker to access the digital asset in the digital asset locker, as, if the attacker does not possess a valid cryptographic key, access to the locker will not be validated. Furthermore, system 700 may preferably be in near constant contact with all devices 705 through the socket adapter 715 shown in FIG. 7C.

In an embodiment, blockchain(s)/sidechain(s) $706_{1-n}$ may comprise several sub-components. For example, each block on the blockchain(s)/sidechain(s) $706_{1-n}$ may contain hashes, a height, nonce value, confirmations, and/or a Merkle Root, among other examples.

Figure 8A:
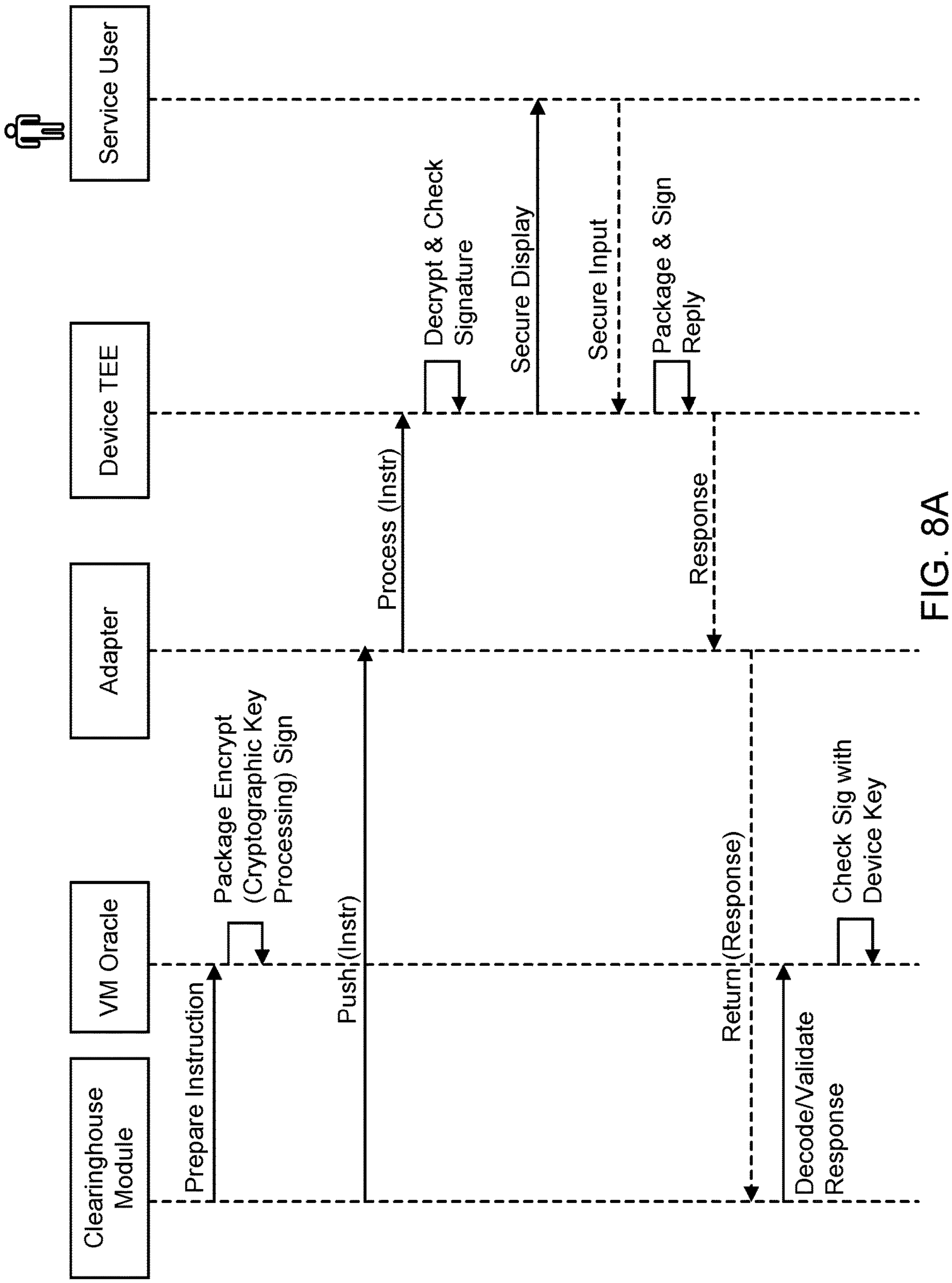
FIG. 8A is a diagram of a sequence of packaging and delivering an instruction according to an embodiment.

In an embodiment, a sequence of packaging and delivering an instruction is shown in FIG. 8A. The cross-chain clearinghouse control system 704 may generate an instruction record with the help of the VM oracle 710 libraries. The instruction may include the type, the target device, and payload. The instruction may be encoded with one or more cryptographic keys. The cryptographic key is fetched from the blockchain(s)/sidechain(s) $706_{1-n}$, by looking up the device registration record.

Figure 8B:
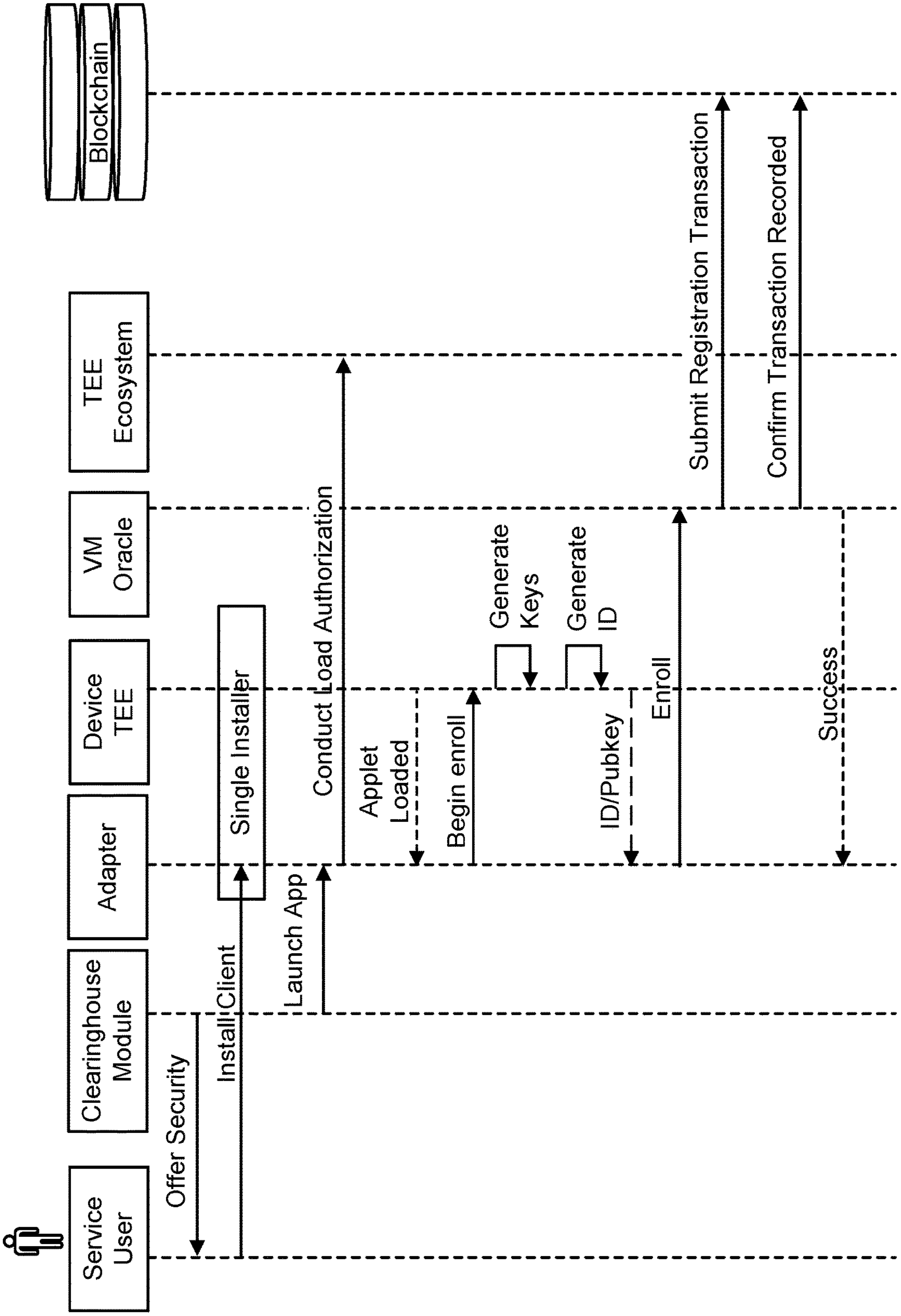
FIG. 8B is a diagram of a device enrollment process according to an embodiment.

In an embodiment, device enrollment may be performed. An example enrollment process, shown in FIG. 8B, should be hassle free, or even transparent to the user. This embodiment may ensure that system 700 is operating in a proper TEE.

Figure 9:
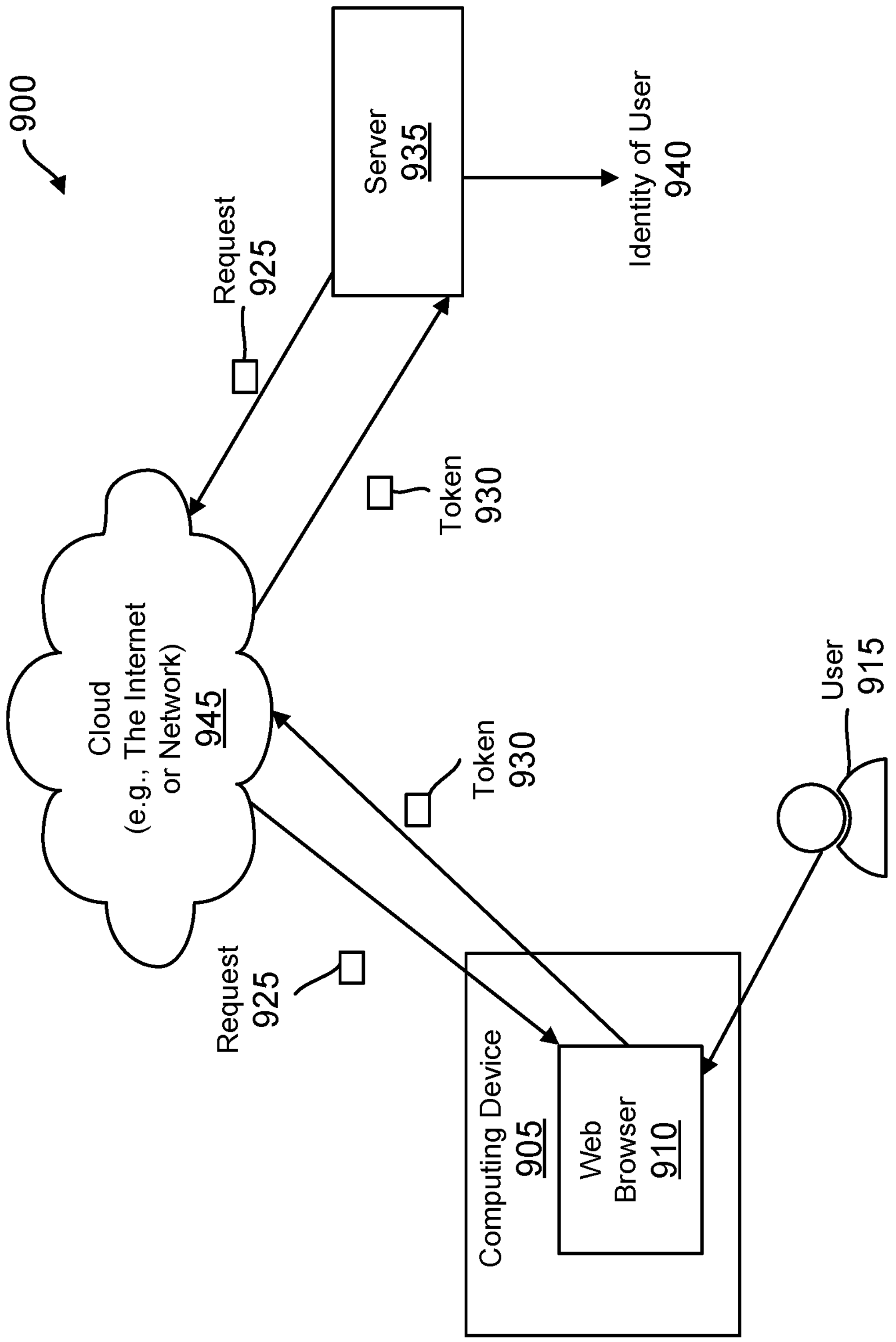
FIG. 9 is a simplified block diagram of an example user identification system according to an embodiment.

FIG. 9 shows an example of a user identification system 900 according to an embodiment. A user 915 interacts via user input 920 with a website displayed via a web browser 910 running on computing device 905, such as clicking an advertisement on the displayed website. The interaction is communicated to server (token server) 935. For example, a transparent pixel or script may be placed on the displayed website to communicate the interaction to the server 935.

An application executing on the server 935 determines whether the user 915 is a software robot or a person user by issuing a request 925 to web browser 910 to produce a token. The request 925 is sent over a network 245. In response to request 925, web browser 910 produces a token 930 on computing device 905. The token 930 is sent to the server 935 over network 945. The application executing on server 935 determines (e.g., using a computational challenge) a computational cost of producing the token 930. In some embodiments, the computational cost of producing the token 930 is based on the time taken to produce the token 930. Based on the computational cost of producing the token 930, the application on server 935 determines (deciphers) whether the user 915 is a software robot or a person user. In some embodiments, proving the computational cost of producing the token 930 at the computing device 905 is performed by an independent third party, rather than the application executing on server 935.

An application that determines whether the user 915 is software robot or a person user may also exist locally on the computing device 905. In this embodiment, it would not be necessary to send request 925 or token 930 over a network 945.

In some embodiments, the request 925 is issued in response to particular user engagement in the web browser 910 and based on user engagement metrics, including mouse movements by the user. The request 925 can also be issued in response to an elapsed period of time or issued by a web service.

In some embodiments the application on server 935 of FIG. 9 calculates a confidence score and metrics associated with whether the user 915 operating computing device 905 is at least in part by a software robot or a person user. Once the application on server 935 determines whether user 915 is a software robot or a person user, the application on server 935 returns the identity of the user 940 and a calculated confidence score, which is associated with a likelihood of whether computing device 905 is being operated by a software robot or a person user. Thus, the calculated confidence score indicates a confidence value regarding the user identification. The confidence score helps the relying party determine a measure of confidence about the identity of the user 940.

The confidence score can be based on many different factors. One factor is the computational cost of the produced token 930. If the proven computation cost is low (below a threshold value), the confidence score may be increased. Further, if computing device 905 is a server, the computational cost is higher than if the computing device 905 is an individual machine, and thus the confidence score may be increased. The confidence score may be based on the time it took computing device 905 to produce the token 930. For example, longer times (e.g., above a time threshold) for producing token 930 may be associated with a higher likelihood that the identity of the user 940 is a software robot and a lower likelihood that the identity of the user 940 is a person user. In another embodiment, the confidence score is increased if the computing device 905 includes a TPM (Trusted Platform Module).

According to some embodiments, produced token 930 is captured in a cookie. In an embodiment, the captured produced token and the computational cost of the captured produced token 930 are time sensitive and expire after a period of time. Captured cookies can sign cookies generated in the future thus, building up proof of whether the web browser 910 running on computing device 905 is being operated by a person user or a bot. The building up of proof results in a longer block chain, making it increasingly difficult for a web browser running on a machine that is operated by a bot to continue to produce tokens.

In some embodiments, the confidence score may be calculated to further consider the confirmed purchase activities of the user. The score may increase when determined that a user is a verified purchaser who previously completed an online purchase. The proof of a user being an online purchaser, such as a retrieved proof of purchase cookie associating the user's identity to an entry in a database of confirmed purchases may increase the confidence score. For example, a retrieved proof of purchase cookie associating the user's identity particularly to a persistent entry in a block chain database of confirmed purchases may further increase the confidence score. That is, the trusted confirmation of the user as a verified purchaser may be associated with a higher likelihood (confidence) that the identity of the user is a person (rather than a software robot).

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 6, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random-access memory (RAM), read-only memory (ROM), compact disk read-only memory (CD-ROM), and so forth. In operation, a general-purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

It should be understood that the term "blockchain" as used herein includes all forms of electronic, computer-based distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

It should also be noted that not all currently known distributed ledger systems utilize linear blockchains as such. Some known blockchain implementations utilize lattice or mesh data structure(s), and some utilize directed acyclic graphs (DAGs).

While example embodiments have been particularly shown and described, it will be understood by those skilled in the art that various changes in form and details may be made therein without departing from the scope of the embodiments encompassed by the appended claims.

What is claimed is:

1. A computer-based system for enforcing encoded conditions of digital assets, the computer-based system comprising:

a first blockchain network including multiple nodes and having a first digital wallet implemented thereon; and a second blockchain network including multiple nodes and having a second digital wallet implemented thereon as an offline entity, the second blockchain network being separate and disparate from the first blockchain network, at least one of the multiple nodes of the first blockchain network comprising a secure cryptoprocessor with a secure execution environment, the secure cryptoprocessor configured to execute a cross-chain enforcement control system, cause the secure cryptoprocessor to:

implement a decoder within the secure execution environment, the decoder configured to decode an encoded condition of a digital asset, the digital asset configured as a non-fungible token (NFT), the encoded condition associated with the first blockchain network;

configure the decoded condition with a threshold value of the digital asset, the threshold value configured to prevent fluctuations in value of the digital asset;

generate a zero-knowledge proof based on the encoded condition of the digital asset, the zero-knowledge proof object being verifiable by the second blockchain network without disclosure of the encoded condition;

transmit a cross-chain transaction message and the zero-knowledge proof to the second blockchain network;

at least one of the multiple nodes of the second blockchain network configured to:

receive the cross-chain transaction message and the zero-knowledge proof from the first blockchain network;

validate the cross-chain transaction message within the second blockchain network based on verification of the zero-knowledge proof, without disclosure of the encoded condition, wherein the cross-chain transaction is relayed within the second blockchain network only upon successful validation by the blockchain node in the second blockchain network and is rejected when validation fails;

responsive to successful verification of the zero-knowledge proof, validate an offline transfer of the digital asset from the first digital wallet on the first blockchain network to the second digital wallet of the offline entity on the second blockchain network;

configure the validated offline transfer to be as transparently viewable from within the second blockchain network; and responsive to unsuccessful verification of the zero-knowledge proof, rejecting the cross-chain transaction within the second blockchain network and disapproving the transfer of the digital asset to the offline entity.

2. The computer-based system of claim 1, wherein the encoded condition triggers a royalty requirement that automatically causes recursive asset transfer back to a creator or prior owner of the digital asset upon transfer of the digital asset.

3. The computer-based system of claim 1, wherein the encoded condition triggers a fractionalized royalty model that specifies enforcement of a distributed royalty arrangement.

4. The computer-based system of claim 1, wherein the first and second blockchain networks are respectively configured to support first and second digital asset platforms.

5. The computer-based system of claim 1, wherein the offline entity is associated with the second blockchain network at a network location separate from a corresponding network location of the first blockchain network.

6. The computer-based system of claim 1, wherein the multiple nodes of the first blockchain network are configured to create a token representing the digital asset, and wherein the encoded condition is configured to influence a transaction value of the digital asset.

7. The computer-based system of claim 1, wherein the encoded condition is configured to implement a transaction value floor for the offline transfer of the digital asset.

8. The computer-based system of claim 1, wherein the encoded condition is configured to require a transaction value of the digital asset to remain within a bounded percentage of a transaction value change from a prior transaction.

9. The computer-based system of claim 1, wherein the first blockchain network is decentralized and the encoded condition comprises a smart contract.

10. A computer-implemented method of enforcing encoded conditions of digital assets, the computer-implemented method comprising:

decoding, by a secure cryptoprocessor within a secure execution environment, an encoded condition of a digital asset configured as a non-fungible token (NFT), the encoded condition being encoded in the digital asset and associated with the first blockchain network;

generating, by the secure cryptoprocessor, a zero-knowledge proof based on the encoded condition of the digital asset without disclosure of the encoded condition;

transmitting, by the secure cryptoprocessor, a cross-chain transaction message and the zero-knowledge proof to a second blockchain network that is separate and disparate from the first blockchain network;

receiving, by a blockchain node in the second blockchain network, the cross-chain transaction message and the zero-knowledge proof from the first blockchain network;

validating, by the blockchain node in the second blockchain network, the cross-chain transaction message within the second blockchain network based on verification of the zero-knowledge proof without disclosure of the encoded condition, wherein the cross-chain transaction is relayed within the second blockchain network only upon successful validation by the blockchain node in the second blockchain network and is rejected when validation fails;

responsive to successful verification of the zero-knowledge proof, validating, by the blockchain node in the second blockchain network, a transfer of the digital asset to an offline entity associated with the second blockchain network; and configuring the validated transfer of the digital asset to the offline entity as transparently viewable within the second blockchain network.

11. The computer-implemented method of claim 10, further comprising configuring the encoded condition to specify a royalty to be paid to a creator or prior owner of the digital asset upon transfer of the digital asset.

12. The computer-implemented method of claim 11, further comprising the encoded condition to implement a fractionalized royalty model that specifies enforcement of a distributed royalty arrangement.

13. The computer-implemented method of claim 12, wherein the first blockchain network and the second blockchain network are respectively configured to support first and second digital asset platforms.

14. The computer-implemented method of claim 10, wherein the offline entity is associated with the second blockchain network at a network location separate from a corresponding network location of the first blockchain network.

15. The computer-implemented method of claim 10, further comprising:

creating a token representing the digital asset; and establishing a threshold value pertaining to a transaction value of the digital asset, wherein the encoded condition is configured to analyze the threshold value.

16. The computer-implemented method of claim 15, further comprising at least one of: (i) implementing, via the threshold value, a transaction value floor for the transfer of the digital asset; and (ii) implementing a condition whereby the transaction value of the digital asset remains within a bounded percentage of a transaction value change from a prior transaction, wherein the threshold value is based on the bounded percentage.

* * * * *